(12) United States Patent
Harper et al.

(10) Patent No.: US 11,027,648 B2
(45) Date of Patent: Jun. 8, 2021

(54) DYNAMIC SOUND EMISSION FOR VEHICLES

(71) Applicant: Zoox, Inc., Foster City, CA (US)

(72) Inventors: Jacob Avi Harper, Alameda, CA (US); Kevin Mark Karol, San Francisco, CA (US); Michael Moshe Kohen, Palo Alto, CA (US); Forrest Leighton Merrill, Walnut Creek, CA (US); Subasingha Shaminda Subasingha, Weston, FL (US); Jeremy Yi-Xiong Yang, New York, NY (US)

(73) Assignee: Zoox, Inc., Foster City, CA (US)

( * ) Notice: Subject to any disclaimer, the term of this patent is extended or adjusted under 35 U.S.C. 154(b) by 147 days.

(21) Appl. No.: 16/193,945

(22) Filed: Nov. 16, 2018

(65) Prior Publication Data

US 2020/0156538 A1    May 21, 2020

(51) Int. Cl.
*B60Q 5/00* (2006.01)
*G10K 13/00* (2006.01)
*G10K 9/12* (2006.01)

(52) U.S. Cl.
CPC .............. *B60Q 5/006* (2013.01); *G10K 9/12* (2013.01); *G10K 13/00* (2013.01)

(58) Field of Classification Search
CPC .......... B60Q 5/006; G10K 9/12; G10K 13/00; G10K 2200/00; B60W 60/00; H04R 2410/00; H04R 2400/00; G01C 3/00; B60T 2210/00

See application file for complete search history.

(56) References Cited

U.S. PATENT DOCUMENTS

| | | | |
|---|---|---|---|
| 9,878,664 B2 | 1/2018 | Kentley-Klay et al. | |
| 10,315,563 B1* | 6/2019 | Harper | B60Q 5/008 |
| 10,414,336 B1* | 9/2019 | Harper | B60Q 5/006 |
| 10,427,676 B2* | 10/2019 | Jafari Tafti | B60W 30/18163 |
| 2005/0041529 A1* | 2/2005 | Schliep | G01V 1/001 |
| | | | 367/99 |

(Continued)

FOREIGN PATENT DOCUMENTS

WO    WO2018057765 A1    3/2018

OTHER PUBLICATIONS

U.S. Appl. No. 15/947,486, filed Apr. 6, 2018, Sapp, et al., "Feature-Based Prediction", 36 pages.

(Continued)

*Primary Examiner* — Rami Khatib
*Assistant Examiner* — Gabriel J Lambert
(74) *Attorney, Agent, or Firm* — Lee & Hayes, P.C.

(57) ABSTRACT

A vehicle computing system may implement techniques to dynamically adjust a volume and/or frequency of a sound emitted from a vehicle to warn an object (e.g., dynamic object) of a potential conflict with the vehicle. The techniques may include determining a baseline noise level and/or frequencies proximate to the object. The baseline noise level and/or frequencies may be determined based on an identification of one or more noise generating objects in the environment. The vehicle computing system may determine the volume and/or a frequency of the sound based in part on the baseline noise level and/or frequencies, an urgency of the warning, a probability of conflict between the vehicle and the object, a speed of the object, etc.

20 Claims, 9 Drawing Sheets

(56) References Cited

U.S. PATENT DOCUMENTS

| | | | |
|---|---|---|---|
| 2005/0175186 A1* | 8/2005 | Yasushi | B60Q 9/00 |
| | | | 381/61 |
| 2009/0115635 A1* | 5/2009 | Berger | G01H 3/08 |
| | | | 340/943 |
| 2011/0010046 A1* | 1/2011 | Harada | G05D 1/0289 |
| | | | 701/36 |
| 2015/0139442 A1* | 5/2015 | Kreifeldt | G10K 15/02 |
| | | | 381/86 |
| 2017/0120804 A1 | 5/2017 | Kentley et al. | |
| 2017/0120814 A1* | 5/2017 | Kentley | B60Q 5/008 |
| 2017/0222612 A1* | 8/2017 | Zollner | G08G 1/167 |
| 2018/0050635 A1* | 2/2018 | Vincent | B60W 30/095 |
| 2018/0290590 A1* | 10/2018 | Goldman-Shenhar | |
| | | | B60Q 1/506 |
| 2019/0096256 A1* | 3/2019 | Rowell | G01S 17/58 |
| 2019/0179322 A1* | 6/2019 | Zych | B60K 28/02 |
| 2019/0308640 A1* | 10/2019 | Miller | B60W 30/182 |
| 2019/0383239 A1* | 12/2019 | Dudar | F02M 25/0836 |
| 2019/0384302 A1* | 12/2019 | Silva | G05D 1/024 |
| 2020/0156538 A1* | 5/2020 | Harper | B60Q 5/006 |

OTHER PUBLICATIONS

U.S. Appl. No. 16/011,436, filed Jun. 18, 2018, Silva, et al., "Occlusion Aware Planning", 55 pages.

U.S. Appl. No. 16/011,468, filed Jun. 18, 2018, Silva, et al., "Occulsion Aware Planning and Control", 56 pages.

PCT Search Report and Written Opinion dated Mar. 12, 2020 for PCT Application No. PCT/US2019/059708, 9 pages.

* cited by examiner

DYNAMIC SOUND EMISSION FOR VEHICLES

BACKGROUND

A majority of vehicles in operation today are equipped with horns that enable an operator of a vehicle to call attention to the vehicle, such as to warn others of a potential hazard in an environment. Conventional vehicle horns are configured to emit a sound at a particular frequency and volume. However, the particular frequency and/or volume of the vehicle horn may often be drowned out by other noises in the environment. As such, the vehicle horn may be ineffective in warning others of the potential hazard. Additionally, the vast majority of vehicle horns are manually operated, and thus are not configured for effective use in autonomous vehicles.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

FIG. 3A is an illustration of an environment in which the dynamic sound emission system may determine to emit a warning signal based at least in part on one or more objects being detected. FIG. 3B is an illustration of an environment in which the dynamic sound emission system may determine to not emit a warning signal based at least in part on a lack of objects detected in the environment.

DETAILED DESCRIPTION

Figure 1:
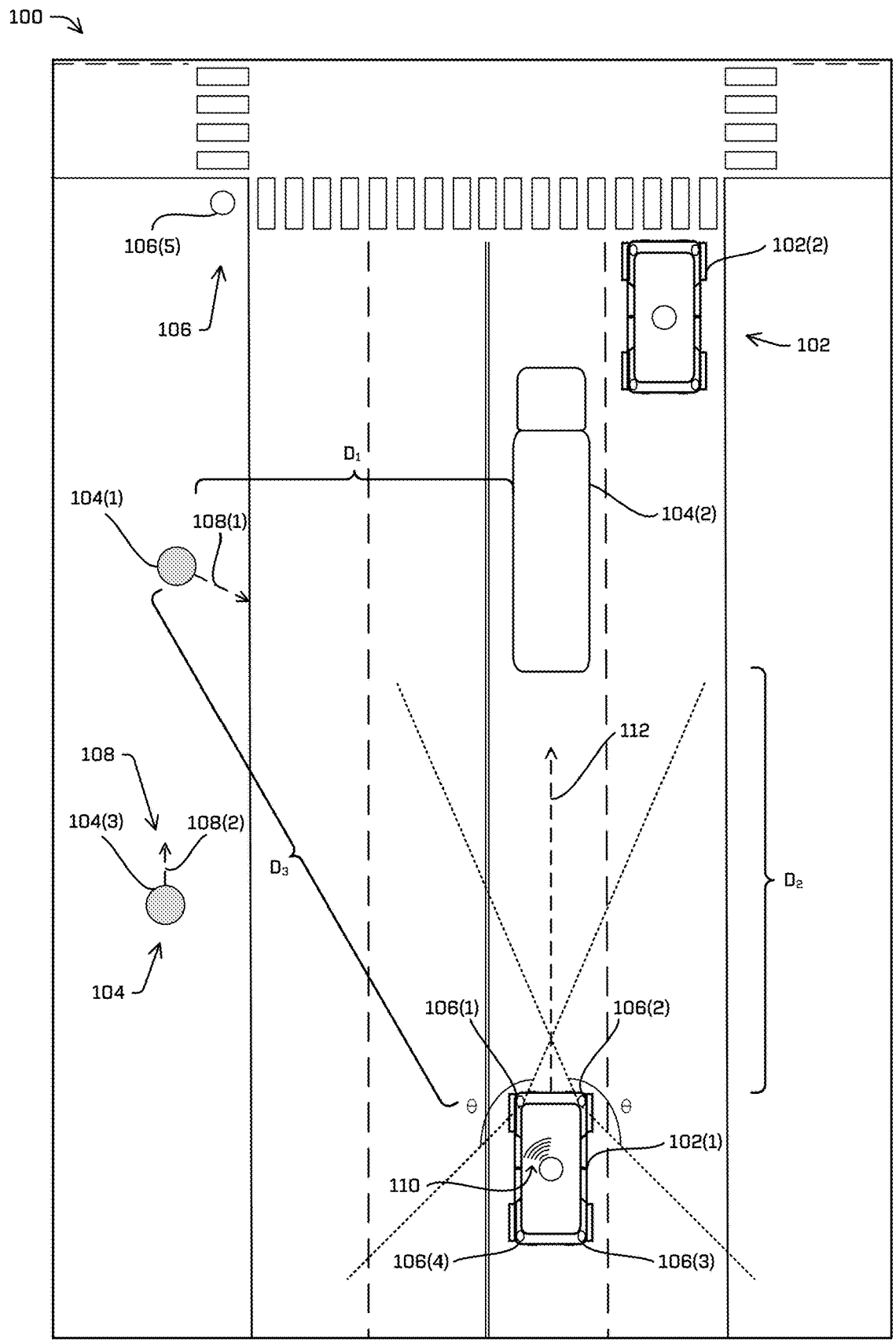
FIG. 1 is an illustration of an autonomous vehicle in an environment in which a dynamic sound emission system of the autonomous vehicle may determine a potential conflict between an object in the environment and the vehicle and emit a sound to alert the object of the potential conflict, in accordance with embodiments of the disclosure.

This disclosure is directed to techniques for improving vehicle warning systems. The vehicle warning systems may be configured to emit a sound to warn dynamic objects (e.g., agents) in an environment proximate the vehicle of a potential conflict with the vehicle. The vehicle may include an autonomous or semi-autonomous vehicle. The objects may include pedestrians, bicyclists, other vehicles (e.g., cars, trucks, motorcycles, mopeds, etc.), or the like. A vehicle computing system may be configured to identify an object in the environment and determine that a potential conflict between the vehicle and the object may occur. The vehicle computing system may determine a baseline amount of noise (e.g., noise floor) around the object and one or more volumes and/or one or more frequencies of sound to emit toward the object to alert the object of the potential conflict.

The vehicle computing system may be configured to identify objects in the environment. In some examples, the objects may be identified based on sensor data from sensors (e.g., cameras, motion detectors, light detection and ranging (lidar), radio detection and ranging (radar), etc.) of the vehicle. In some examples, the objects may be identified based on sensor data received from remote sensors, such as, for example, sensors associated with another vehicle or sensors mounted in an environment that are configured to share data with a plurality of vehicles.

The vehicle computing system may be configured to emit a warning signal toward one or more objects in the environment. In some examples, the vehicle computing system may emit the warning signal based on a determination to alert the object(s) of the presence of the vehicle. For example, the vehicle computing system may detect a bicyclist on the road and may determine that the bicyclist may not hear the vehicle approaching from behind. The vehicle computing system may emit a warning signal toward the bicyclist, such as to warn the bicyclist of the vehicle's approach so that the bicyclist does not swerve or otherwise maneuver into the road. The warning signal may include one or more particular frequencies and/or volume(s), such as to alert the bicyclist of the vehicle presence, but not cause the bicyclist to become disoriented or startled.

In various examples, the vehicle computing system may emit the warning signal based on a determination of a potential conflict between an object and the vehicle. In some examples, the vehicle computing system may determine a trajectory of the object (e.g., position, velocity, acceleration, etc. of the object as it moves through an environment) based on the sensor data. The potential conflict may be based on a comparison of the trajectory of the object and a speed of the vehicle along a path through the environment (e.g., trajectory of the vehicle). For example, the vehicle computing system may identify a pedestrian on a sidewalk that is approaching a curb with a trajectory indicative of an intent to jaywalk across the road. The vehicle computing system may determine that the trajectory of the pedestrian may conflict with the vehicle traveling along a path in the road. Based on the potential conflict, the vehicle computing system may emit a warning signal toward the pedestrian to alert the pedestrian of the potential conflict. In various examples, the trajectory and/or intent of an object may be determined utilizing techniques described in U.S. patent application Ser.

No. 15/947,486 filed Apr. 6, 2018 and entitled "Feature-Based Prediction," the entire contents of which are incorporated herein by reference.

In various examples, the vehicle computing system may determine a volume of the warning signal to emit based on one or more noises in the environment. In some examples, the vehicle computing system may be configured to determine a noise floor proximate to (e.g., within a threshold distance of) the potentially conflicting object. The noise floor may be determined based on detecting one or more noise emitting objects (e.g., music playing on sidewalk, construction equipment, etc.) in the environment and determining a noise floor proximate the object to be alerted, given the one or more noise emitting objects and relative distances and speeds to the object to be alerted. In various examples, the vehicle computing system may combine the one or more noises, such as in a logarithmic calculation, to determine the noise floor. The noise emitting objects may include stationary and/or dynamic objects. In various examples, the vehicle computing system may store noise values associated with particular objects. In such examples, the vehicle computing system may access the stored noise values to determine a noise floor proximate to the potentially conflicting object. For example, the vehicle computing system may identify a semi-truck passing 5 meters in front of a pedestrian in the road. The vehicle computing system may access a datastore of noises associated with semi-trucks and determine that a noise floor 5 meters away from a semi-truck is approximately 75 decibels. The vehicle computing system may adjust a volume of the warning signal to be perceived by the pedestrian at 82 decibels, to be louder than the noise floor to get the attention of the pedestrian.

In various examples, the vehicle computing system may be configured to extrapolate a volume of a noise emitted from a noise emitting object proximate to the potentially conflicting object based on a perceived noise of the noise emitting object at the vehicle. In such examples, the vehicle computing system may determine a first distance between the noise emitting object and the vehicle and a second distance between the noise emitting object and the potentially conflicting object. The vehicle computing system may then determine a noise of the noise emitting object perceived by the vehicle at the first distance and extrapolate a noise value perceived by the potentially conflicting object at the second distance.

In various examples, the vehicle computing system may adjust a volume of the warning signal, as perceived by the potentially conflicting object, based on the noise floor. In such examples, the vehicle computing system may emit the warning signal at a volume to be perceived by the potentially conflicting object at a noise level above the noise floor. In various examples, a volume increase of the warning signal above the noise floor may be based on a probability of conflict with the potentially conflicting object (e.g., low, medium, high, etc.). In some examples, the number of decibel increase in the volume may be based on an urgency of the warning (e.g., low urgency, high urgency, etc.). For example, a first warning signal alerting the object, such as the bicyclist described above, of the presence of the vehicle may be about two to about six decibels above the noise floor, whereas a second warning signal alerting a jaywalker who has entered a roadway of the potential conflict with the vehicle may be about fifteen to about twenty decibels above the noise floor.

In some examples, the vehicle computing system may be configured to adjust a volume of the warning signal based on one or more other objects located in the environment between the potentially conflicting object and the vehicle. In such an example, the vehicle computing system may identify the other object(s) and determine that the other object(s) are in an audible path (e.g., path of the directed audio beam, beam formed audio signal) between a speaker of the vehicle emitting the sound and the potentially conflicting object. The vehicle computing system may decrease the volume of the warning signal directed at the potentially conflicting object to ensure the other object(s) do not sustain hearing damage and/or other ill effects from the warning signal.

In some examples, the vehicle computing system may be configured to adjust a volume of the warning signal based on a speed associated with the vehicle. In such examples, the vehicle computing system may increase the volume associated with the warning signal as the speed of the vehicle increases, and vice versa. In some examples, the volume increase may be based on ranges of speeds. For example, the warning signal may be emitted at a first volume between 25 and 35 miles per hour, a second volume between 36 and 45 miles per hour, and a third volume between 46 and 55 miles per hour.

In various examples, the vehicle computing system may be configured to determine one or more frequencies of the warning signal to emit. The frequencies may be based on an urgency associated with the warning signal, a speed associated with the vehicle and/or the potentially conflicting object, a probability of conflict between the vehicle and the potentially conflicting object, or the like. For example, the vehicle computing system may determine that particular objects, such as pedestrians, are present in the environment and may emit a frequency or range (e.g., set) of frequencies based on the presence of the particular objects, to alert the objects of the vehicle operation in the environment. As a non-limiting example, the vehicle may detect a pedestrian near a large truck and, based on low frequencies emitted from the truck's engine, determine to emit frequencies toward the pedestrian at relatively higher frequencies in order to notify the pedestrian. For another example, the vehicle computing system may determine that a probability of conflict (e.g., collision) with a jaywalker that has entered a road on which the vehicle is traveling is high (e.g., above a threshold probability of conflict) and may emit a frequency or range of frequencies corresponding to an emergency alert.

Additionally or in the alternative, the vehicle computing system may be configured to determine an action for the vehicle to perform to avoid a conflict with a potentially conflicting object in the environment. The action may include yielding to the potentially conflicting object (e.g., slowing down or stopping, using emergency braking, etc.), and/or changing a planned path associated with the vehicle (e.g., lane change right, lane change left, change planned path of vehicle within lane, drive on shoulder, etc.). In various examples, the vehicle computing system may determine the action based on a distance to the potentially conflicting object, a speed of the vehicle, a trajectory of the potentially conflicting object, or the like. For example, the vehicle computing system may identify a person on a scooter that is entering a roadway on which the vehicle is traveling. The vehicle computing system may determine a trajectory of the scooter, a distance between the vehicle and the scooter, a speed of the vehicle, other traffic on the roadway, and/or options for maneuvering the vehicle. The vehicle computing system may determine that, to avoid a collision with the scooter, the vehicle should apply emergency braking. The vehicle computing system may cause the vehicle to apply emergency braking, or any other maneuver. For another example, the vehicle computing system may determine that a lane change to the right would be a more efficient action to avoid a collision with the scooter. The vehicle computing system may determine that the right lane is clear of other objects and may cause the vehicle to change lanes. In some examples, the vehicle computing system may identify an object that may be affected by the sudden lane change of the vehicle and may emit a warning signal directed to the object. In such examples, the vehicle computing system may further prevent damage to other objects in the environment.

The techniques described herein may be implemented in a number of ways. Example implementations are provided below with reference to the following figures. Although discussed in the context of an autonomous vehicle, the methods, apparatuses, and systems described herein may be applied to a variety of systems (e.g., a sensor system or a robotic platform), and are not limited to autonomous vehicles. In another example, the techniques may be utilized in an aviation or nautical context, or in any system using machine vision (e.g., in a system using image data). Additionally, the techniques described herein may be used with real data (e.g., captured using sensor(s)), simulated data (e.g., generated by a simulator), or any combination of the two.

FIG. 1 is an illustration of an autonomous (or semi-autonomous) vehicle 102 in an environment 100, in which a dynamic sound emission system of the autonomous vehicle (vehicle 102) may determine a potential conflict between an object 104, such as object 104(1), in the environment 100 and the vehicle 102, such as vehicle 102(1) and emit a sound to alert the object 104(1) of the potential conflict. A vehicle computing system may perform the dynamic sound emission system of the vehicle 102(1). While described as a separate system, in some examples, the sound emission and/or conflict avoidance techniques described herein may be implemented by other vehicle systems, components, and/or computing devices. For example, and as will be described in further detail with regard to FIG. 4, the sound emission and/or conflict avoidance techniques described herein may be implemented at least partially by or in associated with a planning component.

In various examples, the vehicle computing system may be configured to detect one or more objects 104 in the environment 100. The vehicle computing system may detect the object(s) 104 based on sensor data received from one or more sensors 106. In some examples, the sensor(s) 106 may include sensors mounted on the vehicle 102(1), such as sensors 106(1), 106(2), 106(3) and 106(4). The sensor(s) 106 may include lidar sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, time of flight, etc.), microphones, wheel encoders, environment sensors (e.g., temperature sensors, humidity sensors, light sensors, pressure sensors, etc.), etc. In various examples, each illustrated sensor 106, such as sensors 106(1) and 106(2), may include multiple instances of each of these or other types of sensors. In the illustrative example, the vehicles 102 include four (4) sensors 106. However, in other examples, the vehicles 102 may include a greater or lesser number of sensors 106.

The sensor(s) 106, such as sensors 106(1) and 106(2) may be configured to collect sensor data over an angle θ. Though illustrated as an angle of less than 180 degrees, the angle θ may include angles of greater or lesser degrees (e.g., any angle between 0 and 360 degrees, etc.). In the illustrative example, the sensors 106(1) and 106(2) collect sensor data over a same angle θ. In other examples, sensors 106(1) and 106(2) may collect sensor data over different angles.

In various examples, the vehicle computing system may be configured to receive sensor data from one or more remote sensors 106. In some examples, the remote sensor(s) 106 may be mounted on another vehicle 102, such as vehicle 102(2). In some examples, the remote sensor(s) 106 may include sensor(s) 106 mounted in the environment 100, such as sensor 106(5). For example, sensor 106(5) may be placed in the environment 100 for traffic monitoring, collision avoidance, or the like. In various examples, vehicle 102(1) may be configured to transmit and/or receive data from vehicle 102(2) and/or remote sensor 106(5). The data may include sensor data, such as data regarding object(s) 104 detected in the environment 100.

In various examples, the vehicle computing system may receive the sensor data and may determine a type of object 104 (e.g., classification of the object), such as, for example, whether the object 104 is a pedestrian, such as objects 104(1) and 104(3), a semi-trailer truck, such as object 104(2), a motorcycle, a moped, a bicyclist, or the like. In various examples, the vehicle computing system may determine a trajectory 108 associated with an object 104 detected in the environment 100. In some examples, the trajectory 108 may include a direction and/or speed that the object 104 is traveling through the environment 100.

Based on the determined trajectories 108 associated with object(s) 104, the vehicle computing system may determine that an object 104 may potentially conflict with the vehicle 102(1) (e.g., potentially conflicting object 104(1)). The potentially conflicting object 104(1) may include an object 104 that has a trajectory 108(1) (e.g., either of a predicted or determined trajectory) that conflicts with a vehicle trajectory 112 (e.g., intersects at a time that, if trajectories 108(1) and 112 remain substantially unchanged, could result in a collision between the vehicle 102(1) and the potentially conflicting object 104(1)). The vehicle trajectory 112 may be based on a path, speed and/or accelerations of the vehicle 102(1) through the environment 100.

In various examples, the vehicle computing system may determine that an object 104 may potentially conflict with the vehicle 102(1) based on a probability of conflict between the object 104 and the vehicle 102(1). The probability of conflict may be based on a determined likelihood that the object 104 will continue on the trajectory 108(1) and/or alter the trajectory 108(1) to one that conflicts with the vehicle 102(1). In some examples, the probability of conflict may correspond to a likelihood (e.g., probability) of conflict between the vehicle 102(1) and the object 104 being above a threshold level (e.g., threshold probability) of conflict. In some examples, the probability of conflict may be determined based on a classification associated with the object 104. In such examples, the classification associated with the object 104 may assist in determining the likelihood that the object 104 will maintain or alter a trajectory. For example, a bicyclist riding on the shoulder of a straight road with no intersections nearby is likely to maintain a trajectory 108 that will not conflict with the vehicle 102(1), as the vehicle can assume that bicycles are incapable of sudden changes in orientation. The bicyclist may thus be determined to not be a potentially conflicting object 104. For another example, a deer detected on a side of a roadway may be unpredictable and thus may have a high likelihood of altering a trajectory to conflict with the vehicle 102(1). As such, the deer may be determined to be an object 104 that may potentially conflict with the vehicle 102(1).

In some examples, a detected loss of the sensor(s) 106 may cause the vehicle computing system to tighten parameters with respect to trajectory predictions. For example, a sensor 106(2) on the vehicle may cease working, leaving an angle of the vehicle with degraded perception (e.g., less sensor data available). To compensate for the loss, the vehicle computing system may decrease tolerances with respect to objects and predictions of object trajectories, resulting in a more conservative approach toward the object(s) 104, which may comprise altering (e.g., raising) a volume and/or frequencies of sounds emitted.

Based at least in part on determining that a potentially conflicting object 104(1) exists in the environment 100, the vehicle computing system can determine one or more volumes and/or one or more frequencies (e.g., a set/range of frequencies) of a warning signal 110 to emit. The volume(s) and/or frequencies of the warning signal 110 may be based on a baseline noise level (e.g., noise floor) in the environment 100 and/or a noise floor proximate to the potentially conflicting object 104(1). The noise floor may include a common decibel value and/or decibel range that represents ambient noise in the environment 100 and/or proximate to the potentially conflicting object 104(1). In various examples, the vehicle computing system may determine the volume(s) and/or frequencies of the warning signal 110 to emit in order to give notice to object(s) 104 in the environment, such as potentially conflicting object 104(1), that the vehicle computing system is aware of the presence of the object(s) 104 in the environment (e.g., notice that the object(s) 104 are detected).

In some examples, the vehicle computing system may determine the noise floor of the environment 100 and/or the noise floor proximate to the potentially conflicting object 104(1) based on sensor data, such as from one or more visual and/or auditory perception sensors. In some examples, the vehicle computing system may receive the sensor data corresponding to objects(s) 104 proximate to potentially conflicting object 104(1) and determine a level of noise (e.g., noise event) generated by the object 104, such as based on a classification associated the object(s) 104. The level of noise may be determined based on data stored on the vehicle computing system and/or a remote computing system and corresponding to the classification associated with the object(s) 104. In various examples, the vehicle computing system may utilize machine learning techniques to determine the level of noise emitted by the object. In some examples, a data model may be trained to identify (e.g., classify) object(s) 104 and/or determine, based on a classification of an object and/or a distance to the potentially conflicting object 104(1), a distinct noise event generated by the object(s) 104.

In some examples, the noise floor(s) may be determined based at least in part on non-distinct noise events that occur (e.g., perceived by the sensor(s)) in the environment. Non-distinct noise events may include noises generated from weather (e.g., wind, rain, hail, etc.), vehicles in the environment (e.g., idling, passing, accelerating, braking, etc.), and/or other noises in the environment 100 (e.g., street music, people talking, etc.). In some examples, the noise floor may be determined based at least in part on distinct noise events, such as horn honks, whistles blowing, brakes hissing, or the like. In various examples, the noise floor proximate to the potentially conflicting object 104(1) may be determined based on detected non-distinct and/or distinct noise events emitted from objects within a threshold distance (e.g., 30 meters, 50 feet, one block, etc.) of the potentially conflicting object 104(1). In some examples, the noise floor may include a logarithmic summation of the non-distinct and/or distinct noise events that occur in the environment.

In various examples, the vehicle computing system may receive the sensor data associated with non-distinct and/or distinct noise events and may apply a smoothing algorithm to the noise events. In some examples, the smoothing algorithm may smooth the overall impact of short-term (e.g., distinct) noise events on the noise floor. For example, the vehicle computing system may receive sensor data corresponding to a car honk that causes a 5-decibel spike in the ambient noise. The smoothing algorithm may be applied to smooth the car honk to 2 decibels, to have less of an impact on a determined noise floor.

In various examples, the vehicle computing system may determine the noise floor(s) based on a cumulative distribution of noise events over a period of time (e.g., 2 minutes, 5 minutes, 15 minutes, 60 minutes, etc.). For example, the average noise value in an environment at a time may be 70.5 decibels, the median value may be 69.8 decibels, and the most common value may be 68.3 decibels. Additionally, in the environment at the time, a large majority (80%) of the noise events may be less than 72 decibels. Based on the data, the vehicle computing system may determine that, for at least the example environment at the time, the noise floor in the environment may be between 68-72 decibels.

In various examples, the vehicle computing system may determine the noise floor in the environment 100 based on a location associated with the environment 100, a time of day, a day of the week, a time of year (e.g., season, school in or out of session, etc.), in which the vehicle 102(1) is traveling in the environment 100, or the like. In some examples, the vehicle computing system may access a database of noise floors corresponding to the environment 100 in which the vehicle 102(1) is operating. The database of noise floors may be stored locally and/or remotely, such as on a server computing system or other remote computing system. In some examples, the vehicle computing system may receive noise floor data from one or more remote computing systems, such as, for example, from a remote computing system associated with remote sensor 106(5). In such examples, the remote computing system may be configured to determine a noise floor in the environment 100 and transmit the noise floor data to vehicles 102(1) and 102(2) located in proximity to the remote computing device (e.g., within a threshold distance (e.g., 1 block, 3 blocks, ¼ mile, etc.) thereof).

In various examples, the vehicle computing system may determine a noise floor proximate to the potentially conflicting object 104(1). The noise floor proximate to the potentially conflicting object 104(1) may include a baseline noise level as perceived by the potentially conflicting object 104(1) (e.g., baseline level of noise the object 104(1) hears). The noise floor proximate to the potentially conflicting object 104(1) may be substantially similar to the noise floor in the environment 100 or it may be different.

In various examples, the noise floor proximate to the potentially conflicting object 104(1) may be determined and/or augmented based at least in part on one or more other objects 104 (e.g., dynamic and/or non-dynamic noise emitting objects) proximate to (e.g., within a threshold distance of) the potentially conflicting object 104(1). In some examples, the threshold distance may be based on an amount of noise produced by the other object(s) 104. For example, music emanating from a speaker at a storefront may be released at 70 decibels. The speaker may have an impact on a noise floor as perceived by the potentially conflicting object 104(1) 10 feet away from the speaker, but not 20 feet away. Thus, the threshold distance from the speaker may be determined to be at 10 feet.

In various examples, the vehicle computing system may be configured to determine the amount of noise produced by the other object(s) 104, such as other object 104(2), proximate to the potentially conflicting object 104(1). In some examples, the amount of noise produced by the other object(s) 104(2) may be based on a classification associated with the other object(s) 104(2). In various examples, the amount of noise produced by a particular class of object 104(2) may be based on values previously perceived by one or more sensors 106 and stored in a database of the vehicle computing system and/or one or more remote computing devices. For example, sensor data from the one or more sensors 106 may be used to detect an object 104 and may be further used to classify, by the vehicle computing system, the object 104 as a chopper (e.g., type of motorcycle) operating at a constant speed (e.g., minimal acceleration). The vehicle computing system may determine, based on values stored in the database, that an amount of noise produced by the chopper operating at a constant speed is 80 decibels. The vehicle computing system may further determine a relative distance between the chopper and the potentially conflicting object 104(1), as well as the relative distance from the vehicle 102 to the object 104(1), so as to determine the relative volume and/or frequencies to emit to the object 104(1).

In various examples, the vehicle computing system may determine the amount of noise based on environmental considerations (e.g., uphill, downhill, acceleration, slowing and/or stopping at an intersection, etc.). For example, a semi-trailer truck approaching an intersection may utilize engine braking (e.g., jake brake) to slow down. The engine braking may increase an amount of noise emitted from the semi-trailer truck by 10 decibels or more. The vehicle computing system may factor the additional noise into the noise floor calculation based on a determination that the semi-trailer truck is slowing to a stop at the intersection. For another example, traditional motor vehicles traveling uphill have a tendency to downshift and operate an engine at higher revolutions per minute. The increase in revolutions per minute may increase an amount of noise produced by the motor vehicles and/or a relative frequency of noise emitted. As such, the vehicle computing system may factor in the additional amount of noise and/or frequency into the noise floor calculation of the potentially conflicting object 104(1).

In the illustrative example, the noise floor as perceived by the potentially conflicting object 104(1) is based at least in part on an amount of noise emitted by the other object 104(2), a semi-trailer truck. In various examples, the vehicle computing system may determine a distance $D_1$ between the potentially conflicting object 104(1) and the other object 104(2). In various examples, the vehicle computing system may determine an amount of noise perceived by the potentially conflicting object 104(1) based on the distance $D_1$ (e.g., by extrapolation). For example, the vehicle computing system may determine that the other object 104(2) emits a 90-decibel noise that decreases 15 decibels over the distance $D_1$, to be perceived by the potentially conflicting object 104(1) at 75 decibels. In at least one example, the decibel decrease over the distance $D_1$ may be determined using the inverse-square law ($1/r^2$).

In various examples, the vehicle computing system may determine an amount of noise perceived by the potentially conflicting object 104(1) based on a volume of noise perceived by the vehicle 102(1) and a difference between the distance $D_1$ and a second distance ($D_2$) between the vehicle 102(1) and the other object 104(2). In various examples, vehicle 102(1) may receive audio signals (e.g., sounds) in the environment by one or more directional and/or multi-directional microphones. The vehicle computing system may be configured to correlate the audio signals to a sensed object 104, such as other object 104(2), in the environment. For example, the vehicle computing system may perceive a noise emitted by the other object 104(2) at 60 decibels. The vehicle computing system may correlate the noise with the other object 104(2), classified as a semi-truck. The vehicle computing system may determine that, based on a distance $D_2$, the noise volume decreased by 30 decibels, and that the actual noise emitted by the other object 104(2) was 90 decibels. The vehicle computing system may determine that the distance $D_2$ is greater than the distance $D_1$. Based on the distance and perceived volume, the vehicle computing system may determine that the potentially conflicting object 104(1) may perceive the semi-trailer noise at 75 decibels.

In some examples, an impact of a noise produced by the other object(s) 104 on the potentially conflicting object 104(1) may be based on the noise floor in the environment 100. In various examples, the vehicle computing system may factor in noises produced by the other object(s) 104 to the noise floor proximate to the potentially conflicting object 104(1) based on the noises being a threshold volume above the noise floor in the environment 100. For example, the noise floor in the environment 100 may be determined to be 68-72 decibels. The vehicle computing system may determine that first object produces a first noise that is perceived by the potentially conflicting object 104(1) at 60 decibels and a second object produces a second noise that is perceived by the potentially conflicting object 104(1) at 80 decibels. Based on a determination that the first noise is below the noise floor in the environment 100 and the second noise is above the noise floor in the environment 100, the vehicle computing system may factor in the second noise produced by the second object into the noise floor proximate to the potentially conflicting object 104(1), but not the first noise.

In various examples, the vehicle computing system may determine a frequency or range (e.g., set) of frequencies of the warning signal 110 to emit. In various examples, the frequencies of the warning signal 110 may be based on a classification of the potentially conflicting object 104(1). For examples, the potentially conflicting object 104(1) may be classified as a dog. The vehicle computing system may determine a high pitch frequency that is perceptible to dogs but not humans, thus decreasing an impact on pedestrians, bicyclists, etc. proximate to the potentially conflicting object 104(1).

In various examples, the vehicle computing system may be configured to determine a baseline frequency of the noise floor in the environment 100 and/or the noise floor proximate to the potentially conflicting object 104(1). In some examples, the baseline frequency may include an average frequency of the noise events in the environment 100 and/or proximate to the potentially conflicting object 104(1). In some examples, the baseline frequency may include a predominant frequency of the noise events in the environment 100 and/or proximate to the potentially conflicting object 104(1).

In various examples, the vehicle computing system may determine the volume and/or volume range and/or set of frequencies of the warning signal 110 based in part on the noise floor and/or baseline frequency proximate to the potentially conflicting object 104(1). In various examples, the vehicle computing system may determine the set of frequencies of the warning signal 110 based on an average and/or dominant frequency in the environment. In such examples, the set of frequencies of the warning signal 110 may substantially differ from the average and/or dominant frequency in the environment. In some examples, the vehicle computing system may cause the warning signal 110 to be emitted at a particular volume so that the warning signal 110 is perceived by the potentially conflicting object 104(1) at the volume and/or volume range. The vehicle computing system may determine the particular volume to emit the warning signal 110 based on a distance $D_3$ between the vehicle 102(1) and the potentially conflicting object 104(1).

In some examples, the volume and/or volume range of the warning signal 110 may be higher than the noise floor proximate to the potentially conflicting object 104(1). The frequencies of the warning signal 110 may be higher or lower than the baseline frequency of the noise floor proximate to the potentially conflicting object 104(1). In various examples, the frequencies of the warning signal 110 may include a frequency (or set/range of frequencies) that is perceptible to the potentially conflicting object 104(1), despite ambient noise. The volume and/or volume range and/or frequencies may be determined based on an urgency of the warning (e.g., low urgency (e.g., alert), medium urgency ((e.g., caution), high urgency (e.g., warning)), a likelihood of conflict between the vehicle 102(1) and the potentially conflicting object 104(1), a message to be conveyed to the potentially conflicting object 104(1) (e.g., the vehicle 102(1) is approaching, please stop, trajectories are rapidly converging).

In various examples, the volume and/or volume range and/or frequencies of the warning signal 110 may be determined based on a detected distraction associated with the potentially conflicting object. The detected distraction may include the tactile use of a mobile phone, a determination that the potentially conflicting object is engaged in a conversation (e.g., with another object proximate to the potentially conflicting object, on a mobile phone, or the like), a determination that the potentially conflicting object is wearing headphones, earmuffs, ear plugs, or any other device configured to fit in or around an auditory canal.

In some examples, the volume and/or volume range and/or frequencies of the warning signal 110 may be determined based on weather conditions in the environment. The weather conditions may include rain, wind, sleet, hail, snow, temperature, humidity, large pressure changes, or any other weather phenomenon which may affect an auditory perception of an object 104 in an environment. In various examples, the volume and/or volume range and/or frequencies of the warning signal 110 may be determined based on road conditions in the environment. The road conditions may include a smoothness of road surface (e.g., concrete, asphalt, gravel, etc.), a number of potholes, uneven terrain (e.g., rumble strips, washboards, corrugation of road, etc.), or the like. For example, objects 104 and/or vehicles 102 operating on a gravel road may generate a larger amount of noise than when operating on a smooth surface. The increase in noise generated by the objects 104 and/or vehicles 102 (e.g., impact amount of noise from travel) may result in a subsequent increase in the determined volume and/or volume range of the warning signal 110.

In various examples, the volume and/or volume range and/or frequencies of the warning signal 110 may be determined based on a location of the potentially conflicting agent 104(1) in the environment. For example, if the potentially conflicting agent 104(1) is located in a roadway shared by the vehicle 102(1), the volume and/or volume range may be higher than if the potentially conflicting agent 104(1) is located on the sidewalk, such as indicating an intent to enter the roadway. For another example, if the potentially conflicting agent 104(1) is a pedestrian standing on a median between opposite direction traffic, the volume and/or volume range may be higher than if the potentially conflicting agent 104(1) is located in a bike lane, proximate a curb.

In some examples, the volume and/or volume range and/or frequencies of the warning signal 110 may be determined based on a detected loss of one or more sensors 106 on the vehicle 102(1). For example, the vehicle computing system may determine that a speaker on the vehicle is not functioning at an optimal capacity. Accordingly, the vehicle computing system may increase a volume of the warning signal 110 to compensate for the decreased capacity of the speaker.

In various examples, the volume and/or volume range and/or frequencies of the warning signal 110 may be determined based on a detection of a passenger in the vehicle 102(1). In some examples, the detection of the passenger may be based on sensor data received from one or more sensor(s) 106 of the vehicle. In some examples, the detection of the passenger may be based on a signal received, such as from a computing device associated with the passenger, indicating the passenger presence in the vehicle. In various examples, the vehicle computing system may decrease the volume and/or volume range and/or frequencies of the warning signal 110 based on the detection of the passenger, such as, for example, to not create a negative experience for the passenger due to the emission of a loud noise.

In various examples, the vehicle computing system may identify another object 104, such as object 104(3), that is located substantially between the vehicle 102(1) and the potentially conflicting object 104(1). In some examples, the vehicle computing system may determine that a trajectory 108 associated with the other object 104(3), such as trajectory 108(2), does not conflict with the vehicle trajectory 112. However, based on a location of the other object 104(3) being substantially between the vehicle 102(1) and the potentially conflicting agent 104(3), the other object 104(3) may be substantially affected by the warning signal 110. In various examples, the vehicle computing system may adjust the volume and or volume range based on a consideration associated with the other object 104(3). For example, the volume and/or volume range of the warning signal 110 perceived by the other object 104(3) may be substantially higher than that perceived by the potentially conflicting object 104(1). To mitigate a negative effect on the other object 104(3) caused by the warning signal 110, the vehicle computing system may decrease a determined volume of the warning signal and/or may use a lower volume in a determined volume range as the volume to be perceived by the potentially conflicting object 104(1). Additionally or in the alternative, the vehicle computing system may utilize beam steering in a beam formed array to direct the warning signal 110 at the potentially conflicting object 104(1). In various examples, the vehicle computing system may utilize beam steering and/or beam formed array techniques discussed in U.S. patent application Ser. No. 14/756,993 entitled "Method for Robotic Vehicle Communication with an External Environment via Acoustic Beam Forming, filed Nov. 4, 2015, and issued as U.S. Pat. No. 9,878,664 on Jan. 30, 2018.

In some examples, the vehicle computing system may cause the warning signal 110 to be emitted for a predetermined period of time (e.g., 5 seconds, 10 seconds, 20 seconds, etc.). The period of time may be based on the urgency of the warning, the likelihood of conflict between the vehicle 102(1) and the potentially conflicting object 104(1), the message to be conveyed to the potentially conflicting object 104(1), a speed associated with the vehicle 102(1), or the like. For example, an alert of the presence of the vehicle (e.g., low urgency) may be emitted for 10 seconds, and a warning of highly probable conflict (e.g., high urgency) may be emitted for 20 seconds.

In various examples, the vehicle computing system may dynamically determine the period of time associated with warning signal 110 emission. In some examples, the period of time may be based on a determination of a decrease in a likelihood of conflict. In various examples, the vehicle computing system may be configured to determine a change to the trajectory 108(1) of the potentially conflicting object in response to the warning signal 110. In some examples, the vehicle computing system may determine whether the change was sufficient to decrease a likelihood of conflict between the vehicle 102(1) and the potentially conflicting object 104(1). Based on a determination that the change in trajectory 108(1) was sufficient to decrease a likelihood of conflict, such as to a negligible probability of conflict, the vehicle computing system may determine that the warning signal 110 is no longer necessary and may cause the warning signal 110 to stop emitting.

In various examples, based on a determination that the change in trajectory 108(1) was not sufficient to decrease the likelihood of conflict between the vehicle 102(1) and the potentially conflicting object 104(1), the vehicle computing system may determine to increase a volume and/or a volume range associated with the warning signal 110. In some examples, the increase in the volume and/or volume range may be based on a determined escalation of urgency, such as from low urgency to medium or high urgency, an increase in a likelihood and/or probability of conflict, such as from a medium probability to a high probability, or the like. For example, the vehicle computing system may cause a first warning signal 110 to be emitted from the vehicle 102(1) at a first volume and/or volume range, to alert the potentially conflicting object 104(1) of the vehicle 102(1) operating on the road. The vehicle computing system may determine that the trajectory 108(1) associated with the potentially conflicting object 104(1) did not substantially change as a result of the first warning signal 110. Based on the determination of an insufficient change to the trajectory 108(1), the vehicle computing system may cause a second warning signal 110 to be emitted at a second volume and/or second volume range, the second volume and/or second volume range being greater than the first volume and/or first volume range.

In some examples, based on a determination that the change in trajectory 108(1) was not sufficient to decrease the likelihood of conflict between the vehicle 102(1) and the potentially conflicting object 104(1), the vehicle computing system may determine to change a frequency and/or range of frequencies (e.g., higher or lower) of the warning signal 110. In some examples, the frequency adjustment be based on a determined escalation of urgency, such as from low urgency to medium or high urgency, an increase in a likelihood and/or probability of conflict, such as from a medium probability to a high probability, or the like. For example, the vehicle computing system may cause a first warning signal 110 to be emitted from the vehicle 102(1) at a first frequency (or set/range of frequencies), to alert the potentially conflicting object 104(1) of the vehicle 102(1) operating on the road. The vehicle computing system may determine that the trajectory 108(1) associated with the potentially conflicting object 104(1) did not substantially change as a result of the first warning signal 110. Based on the determination of an insufficient change to the trajectory 108(1), the vehicle computing system may cause a second warning signal 110 to be emitted at a second frequency (or set/range of frequencies) that is higher than the first frequency.

Additionally or in the alternative, the vehicle computing system may determine to emit a sound (e.g., warning signal 110) based on a determination that a passenger is entering and/or exiting the vehicle 102(1). In some examples, the sound may be emitted when the vehicle is stopped. In such examples, the sound may be used to alert other object(s) 104 in the area that the vehicle is altering a passenger load, to inform the other objects(s) 104 that the vehicle 102(1) may be available for use, to stimulate a positive response in the other object(s) 104, or the like.

Additionally or in the alternative, and as will be discussed in further detail below with regard to FIG. 2, based on a determination that the change in trajectory 108(1) was not sufficient to decrease the likelihood of conflict, the vehicle computing system may determine an action for the vehicle 102(1) to take to avoid the conflict. The action may include yielding to the potentially conflicting object 104(1) (e.g., slowing down or stopping, using emergency braking, etc.), and/or changing a planned path associated with the vehicle 102(1) (e.g., lane change right, lane change left, change planned path of vehicle within lane, drive on shoulder, etc.).

Figure 2:
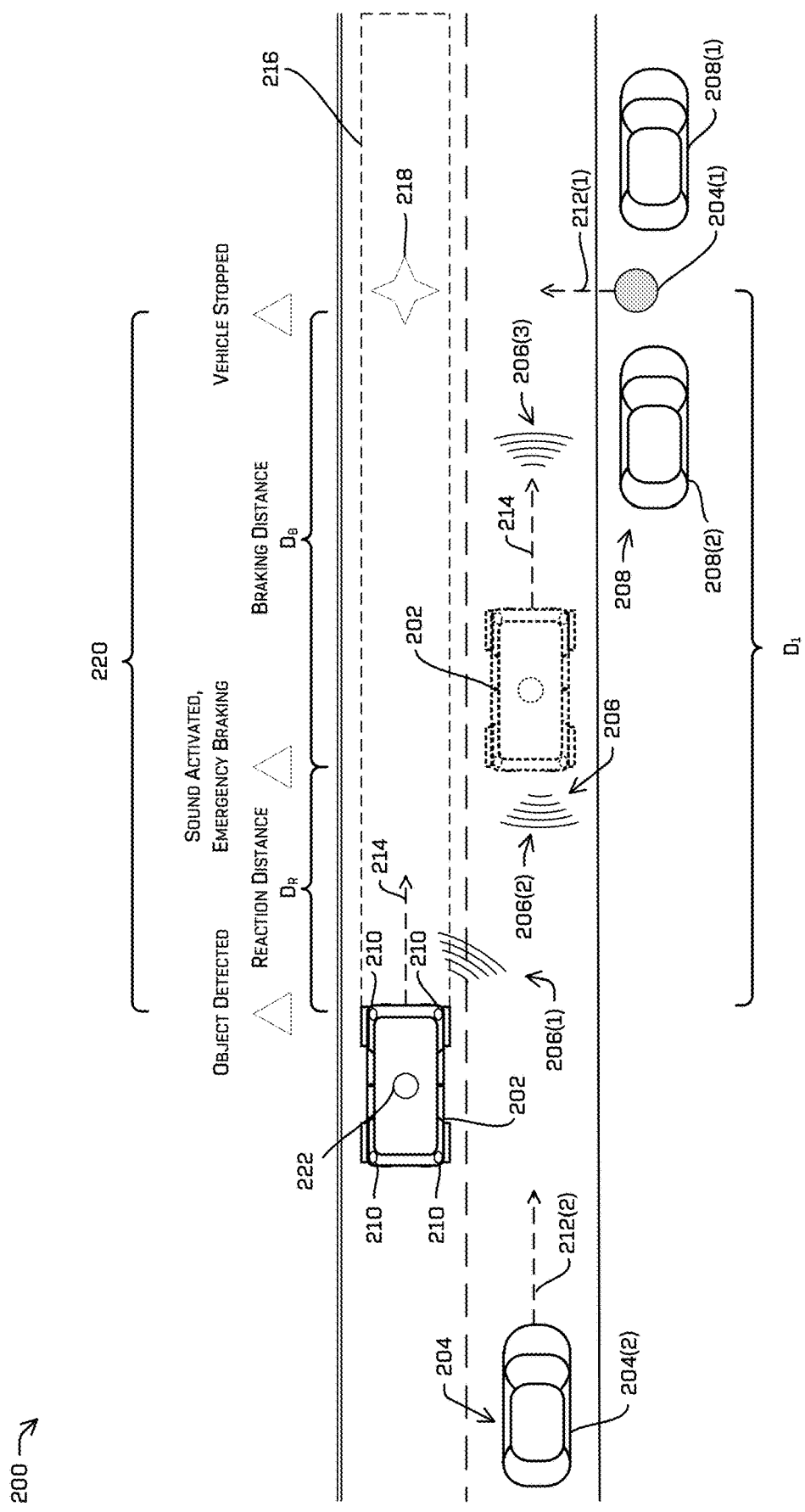
FIG. 2 is an illustration of an autonomous vehicle in an environment in which a dynamic sound emission system of the autonomous vehicle may identify a hazard within a safety zone and activate a warning sound and/or control the autonomous vehicle to avoid the hazard.

FIG. 2 is an illustration of an environment 200, such as environment 100, in which a dynamic sound emission system of the autonomous vehicle 202, such as vehicle 102, may identify an object 204(1) that may conflict with the vehicle 202, such as potentially conflicting object 104(1), and activate a warning signal 206, such as warning signal 110 and/or control the autonomous vehicle 202 to avoid the object 204(1).

A vehicle computing system of the vehicle 202 may be configured to detect one or more objects 204 and/or one or more stationary objects 208 in the environment 200. The vehicle computing system may detect the object(s) 204 and/or the stationary object(s) 208 based on sensor data received from one or more sensors 210. In the illustrative example, the sensor(s) 210 are coupled to the vehicle 202. In some examples, the sensor(s) 210 may additionally or alternatively include sensor(s) 210 remotely located in the environment 200. In various examples, the vehicle computing system may detect the object(s) 204 and may determine a classification associated with each object 204. For example, the vehicle computing system may identify object 204(2) as a car operating in the roadway. For another example, the vehicle computing system may detect the stationary objects 208(1) and 208(2), and may classify each as a parked car.

In various examples, the vehicle computing system may determine trajectories 212 associated with the object(s) 204. In some examples, the trajectory 212 may include a direction and/or speed that the object 204 is traveling through the environment 200. In various examples, the vehicle computing system may determine that one of the object(s) 204, such as object 204(1), may potentially conflict with the vehicle 202. In various examples, a determination of the potentially conflicting object 204(1) may be based on the trajectory 212(1) associated with the potentially conflicting object 204(1) intersecting with a vehicle trajectory 214. The vehicle trajectory 214 may be determined based on a planned path 216, speed and/or acceleration of the vehicle 202 operating in the environment.

In some examples, the determination may be based on the vehicle 202 and the potentially conflicting object 204(1) maintaining a same or substantially similar speed and direction. In some examples, a determination of the potentially conflicting object 204(1) may be based on a probability (e.g., likelihood) of conflict between the vehicle 202 and the potentially conflicting object 204(1). In some examples, the probability of conflict may be determined based on the classification associated with the object 204(1). In such examples, the classification associated with the object 204(1) may assist in determining the likelihood that the object 204(1) will maintain or alter a trajectory.

Based at least in part on determining that a potentially conflicting object 204(1) exists in the environment 200, the vehicle computing system may determine a location 218 associated with a potential conflict (e.g., a collision). The location 218 may be determined based on the trajectory 212(1) of the potentially conflicting object 204(1) and/or the vehicle trajectory 214 remaining the same. In some examples, the location 218 may include an area of the vehicle path 216 that the potentially conflicting object 204(1) travel through on the trajectory 212(1).

In various examples, the vehicle computing system may determine that the location 218 is outside of a safety zone 220 associated with the vehicle 202. The safety zone 220 may include an area in which the vehicle 202, traveling through the environment 200 on the trajectory 214, may apply maximum braking and stop. As illustrated in FIG. 2, the safety zone 220 may include a reaction distance ($D_R$) and a braking distance ($D_B$). Both distances ($D_R$) and ($D_B$) may be based on a current speed, and/or acceleration of the vehicle 202, wear on tires and/or brakes of the vehicle 202, road materials (e.g., asphalt, concrete, etc.), road conditions (e.g., potholes, grading, paint strips, etc.), environmental considerations (e.g., rain, snow, hail, etc.), or the like. In various examples, the vehicle computing system may receive sensor data from the sensors 210 to determine the safety zone 220. In some examples, the safety zone 220 associated with a particular area in an environment 200 and/or speed may be pre-determined and stored in a database accessible by the vehicle computing system. In such examples, the vehicle computing system may access the stored values periodically (e.g., every minute, every 5 minutes, etc.), at a time of a detected change in condition and/or speed/acceleration, and/or randomly while operating in an environment 200. In at least some examples, such a safety zone 220 may be determined based on a number of occlusions detected. In some examples, object 204(1) may be occluded from sensors on vehicle 202 by, for example, object 208(2). In such an example, vehicle 202 may determine to emit a sound at a different volume and/or frequency as compared to other areas due to the risk of objects, such as object 204(1) which may be occluded, yet present a high safety risk. In some examples, the vehicle computing system may implement occlusion determination techniques discussed in U.S. patent application Ser. No. 16/011,436 entitled "Occlusion Aware Planning" and filed Jun. 18, 2018 and U.S. patent application Ser. No. 16/011,468 entitled "Occlusion Aware Planning and Control" and filed Jun. 18, 2018, the entire contents of which are incorporated herein by reference.

In various examples, the vehicle computing system may determine one or more volumes and/or one or more frequencies of the warning signal 206 to emit. As discussed above, the volume(s) and/or frequencies of the warning signal 206 may be determined based on a noise floor in the environment 200 and/or a noise floor proximate to the potentially conflicting object 204(1). In some examples, the volume(s) and/or frequencies of the warning signal 206 may be based an urgency of the warning, a likelihood of conflict between the vehicle 202 and the potentially conflicting object 204(1), and/or a message to be conveyed to the potentially conflicting object 204(1). In various examples, the urgency of the warning, the likelihood of conflict, and/or the message to be conveyed may be based at least in part on the location 218 with respect to the safety zone 220. For example, based on a determination that the location 218 is located greater than a threshold distance from the safety zone 220, the warning signal 206 may include a cautionary signal (e.g., moderate urgency and/or danger). For another example, based on a determination that the location 218 is located substantially proximate to (e.g., within a threshold distance of) the safety zone 220, the warning signal 206 may include an urgent warning (e.g., high likelihood of conflict, extreme danger, etc.).

Based at least on determining the volume(s) and/or frequencies of the warning signal 206, the vehicle computing system may cause a first warning signal 206(1) to be emitted from the vehicle 202, such as via one or more speakers 222 coupled to the vehicle 202. In some examples, the first warning signal 206(1) may include an audio beam emitted in a direction relative to the potentially conflicting object 204(1). In some examples, the first warning signal 206(1) may include a beam formed audio signal directed at the potentially conflicting object 204(1). In some examples, the direction relative to the potentially conflicting object 204(1) may include a position in which the potentially conflicting object 204(1) is first detected and/or an anticipated position based on the trajectory 212(2). In some examples, the first warning signal 206(1) may include an audio beam emitted in a general direction associated with the potentially conflicting object 204(1). The general direction may include an angle (e.g., 45 degrees, 90 degrees, 180 degrees, etc.) at which the potentially conflicting object is traveling relative to the vehicle 202. In some examples, the first warning signal 206(1) may include an audio signal emitted around the vehicle 202, such as up to and including 360 degrees around the vehicle.

Additionally or in the alternative, the vehicle computing system may determine an action for the vehicle 202 to take to avoid the conflict with the potentially conflicting object 204(1). The action may include yielding to the potentially conflicting object 204(1) (e.g., slowing down or stopping, using emergency braking, etc.), and/or changing a planned path associated with the vehicle 202 (e.g., lane change right, lane change left, change planned path of vehicle within lane, drive on shoulder, etc.). In various examples, the action may be determined, based at least in part on the location 218 and the safety zone 220. For example, if the location 218 is located at least a threshold distance from the safety zone 220, the vehicle computing system may determine that the most efficient action to avoid conflict is to stop the vehicle 202 to avoid the conflict. For another example, if the location 218 is located within the safety zone 220, the vehicle 202 may determine that slowing to a stop will not avoid the conflict. Accordingly, the vehicle computing system may cause the vehicle 202 to change lanes to avoid the conflict.

In some examples, the vehicle computing system may determine that the conflict can be avoided by taking two or more actions. In such examples, the action may be determined based on an efficiency associated with each action of the two or more actions. In some examples, the efficiency may be based on a calculated efficiency score corresponding to each action. In such examples, the efficiency score may be based on an amount of time associated with each action (e.g., time to stop, avoid the conflict, and accelerate back up to speed), a probability of conflict with another object 204, such as object 204(2), traffic laws associated with actions, or the like. In various examples, the vehicle computing system may determine a particular action based on the particular action being associated with a highest efficiency score.

In various example, the vehicle computing system may determine to perform two or more actions, such as to increase a safety margin associated with the conflict. The safety margin may be based on a probability (e.g., likelihood) of avoiding the conflict, (e.g., distance between the vehicle 202 and the potentially conflicting object 204(1) on the trajectory 212(1) at a closest point of approach, etc.). For example, the vehicle computing system may determine that a lane change to the right will avoid the conflict and that additionally slowing the vehicle 202 will increase a safety margin associated with the conflict.

Based on the determined action, the vehicle computing system may cause the vehicle 202 to perform the action. In some examples, the action may include slowing or stopping in the vehicle path 216. In some examples, the action may include changing the vehicle path 216, such as a lane change right or left, altering a position in a current lane, swerving left or right, such as into a shoulder of the roadway, or the like. In the illustrative example, the vehicle computing system causes the vehicle 202 to perform a lane change to the right.

In various examples, based on the determined action, the vehicle computing system may identify one or more objects 204 that could potentially be affected by the action (e.g., perform subsequent action, as desired). In the illustrative example, the vehicle computing system may determine that the object 204(2), located in the right-hand lane, may be affected by the vehicle 202 moving into the right lane. For example, the object 204(2) may brake to increase a following distance behind the vehicle 202.

In various examples, based on an identification of the object 204(2), the vehicle computing system may emit a second warning signal 206(2) directed at the object 204(2) (e.g., in a beam formed audio signal), such as to warn the object 204(2) of the lane change and/or of the potentially conflicting object 204(1) entering the roadway. A frequency (or set/range of frequencies) and/or volume(s) of the second warning signal 206(2), similar to the first warning signal 206(1), may be based on a noise floor (including frequency ranges) in the environment, noise floor (including frequency ranges) proximate to the object 204(2), an urgency of the warning, a likelihood of conflict, and/or a message to be conveyed. Additionally, the frequency (or set/range of frequencies) and/or volume(s) of the second warning signal 206(2) may be based on a classification of the object 204(2), an enclosure in which an operator of the object 204(2) is located, and/or an amount of noise (including frequency ranges) experienced by the operator. For example, the vehicle computing system may determine that the object 204(2) is classified a non-autonomous hard-top car with the windows rolled up. The vehicle computing system may determine that the warning signal 206(2) may be emitted at 80 decibels, for an operator of the car to hear. For another example, the vehicle computing system may determine that the object 204(2) is a convertible non-autonomous car operating with the top down. The vehicle computing system may determine that the warning signal 206(2) may be emitted at 60 decibels for the operator to hear.

In various examples, the vehicle computing system may determine that an additional warning signal 206(3) directed toward the potentially conflicting object 204(1) may assist in avoiding conflict between the vehicle 202 and the potentially conflicting object 204(1). In such examples, the vehicle computing system may determine a volume (or set/range of volumes) and/or a frequency (or set/range of frequencies) for the additional warning signal 206(3). The volume(s) and/or frequencies may be the same or different from the first warning signal 206(1).

Figure 3:
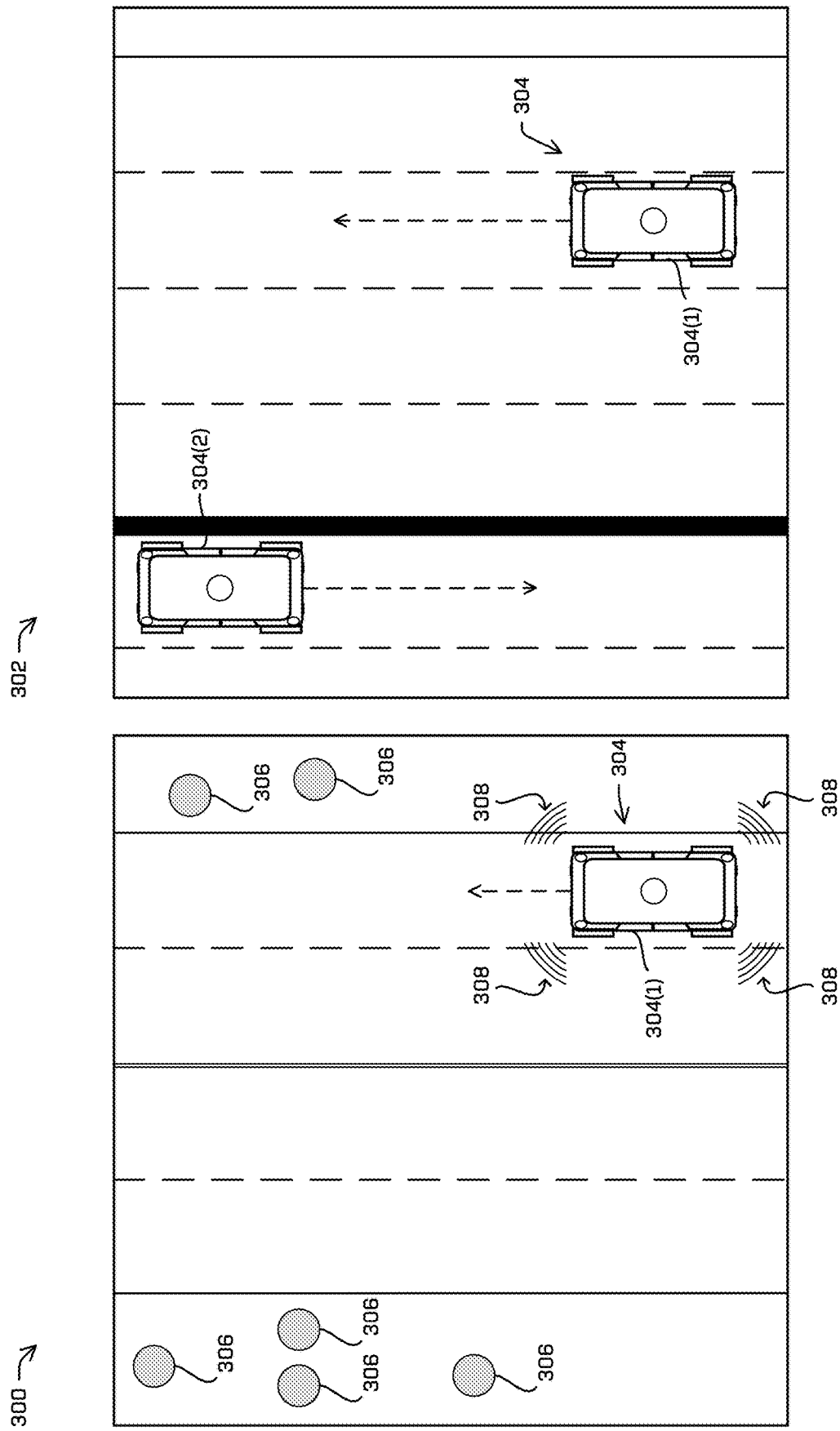
FIGS. 3A and 3B are illustrations of example environments and in which a vehicle configured with a dynamic sound emission system may operate.

FIGS. 3A and 3B are illustrations of example environments 300 and 302 in which a vehicle 304, such as vehicle 102, configured with a dynamic sound emission system may operate. FIG. 3A is an illustration of an environment 300 in which one or more objects 306, such as objects 104 are detected. As discussed above, a vehicle computing system of the vehicle 304 may be configured to detect the object(s) 306 based at least in part on sensor data received from one or more sensors. In some examples, the vehicle computing device may be configured to identify a type of object (e.g., classification) associated with each of the detected object(s).

As illustrated in FIG. 3A, based in part on the detection of the object(s) 306, the vehicle computing system may determine to emit a warning signal 308, such as warning signal 110, to alert the object(s) 306 of the vehicle presence. In some examples, a determination to emit the warning signal 308 may be based on a detection a particular type of object 306 detected. For example, the vehicle computing system may identify objects 306 classified as cars and trucks operating on a roadway of an environment. Based on a determination that only cars and trucks are in the environment, the vehicle computing device may determine to not emit the warning signal 308. For another example, the vehicle computing system may identify objects 306 classified as pedestrians and bicyclists in the environment. Based on the determination that pedestrians and bicyclists are in the environment, the vehicle computing system may determine to emit the warning signal 308.

In various examples, a determination to emit the warning signal 308 may be based on a proximity of at least one object 306 of the object(s) 306 to the vehicle 304(1) and/or a path of the vehicle 304(1). In some examples, the at least one object 306 may include an object that is located closest (e.g., a shortest distance) to the vehicle 304(1) and/or a path of the vehicle 304(1). In some examples, the determination to emit the warning signal may be based on the at least one object 306 being within a threshold distance (e.g., 1 block, 100 yards, 200 meters, etc.) of the vehicle and/or the path of the vehicle 304(1). In various examples, the determination to emit the warning signal may be based on the object(s) 306 being located on a side of a roadway in which the vehicle 304(1) is operating. For example, as illustrated in FIG. 3A, the vehicle is operating in the right lane on the right side of a roadway. The vehicle computing system may determine to emit the warning signal 308 based on the detection of objects 306 on the right side of the road and/or the classification associated with the objects 306 located on the right side of the road.

In various examples, the warning signal 308 may include one or more directed audio signals emitted toward the object(s) 306 (e.g., direct beam sent in the direction of the object). In some examples, the warning signal 308 may be emitted directly at one or more of the object(s) 306, such as by utilizing beam forming techniques described above. In the illustrative example, the warning signal 308 is emitted in directions corresponding to the four corners of the car. In some examples, the warning signal may be emitted in specific quadrants (e.g., front right, back left, etc.) corresponding to the location of the object(s) 306. In some examples, the warning signal 308 may be emitted on a side of the vehicle 304(1) (e.g., right side or left side) corresponding to the location of the object(s) 306. In various examples, the warning signal 308 may be emitted at any angle up to an including 360 degrees around the vehicle, such as 30, 45, 60, 90, 360 degrees, etc.

In various examples, the warning signal 308 may be emitted to alert the object(s) 306 of the presence of the vehicle 304(1). For example, an electrically operated vehicle may produce a negligible amount of operating noise and may be substantially aurally imperceptible to objects 306 in the environment 300. Accordingly, the warning signal 308 may provide a means by which the object(s) 306 may determine the presence of the vehicle 304(1). A frequency or set of frequencies (e.g., waveform) of the warning signal 308 may be determined according to techniques described above with respect to FIGS. 1 and 2. In various examples, the frequencies of the warning signal 308 may be determined based on the purpose of alerting the object(s) 306 of the presence of the vehicle 304(1). In some examples, the frequencies may be determined based on an impression the warning signal 308 may have on the object(s) 306. For example, the frequencies may be associated with a soft, melodic sound that is intended to leave the object(s) 306 with a positive impression of the vehicle 304(1). For another example, the frequencies in a set of frequencies may be selected based on a determination to emulate the sound of a gas-powered vehicle engine. In such an example, the frequencies of the warning signal 308 may adjust higher and lower to simulate an engine adjusting revolutions per minute while operating in the environment.

A volume (or set/range of volumes) of the warning signal 308 may be determined in accordance with volume determinations described above with respect to FIGS. 1 and 2. In various examples, the volume(s) of the warning signal 308 may be determined based at least in part on a speed associated with the vehicle. In some examples, the volume(s) of the warning signal 308 may increase as the speed of the vehicle 304(1) increases, or vice versa. For example, the vehicle computing system may determine to emit a warning signal 308 at 50 decibels based on a determined vehicle 304(1) speed of 15 miles per hour. After increasing the speed to 30 miles per hour, the vehicle computing system may determine to emit the warning signal 308 at 70 decibels.

In various examples, the frequencies and/or volume(s) of the warning signal 308 may be determined based on an area in which the vehicle 304(1) is operating and/or a time (e.g., time of the day, of the week, of the month, of the year, etc.) associated with the operation. For example, the vehicle computing system may determine that the vehicle 304(1) is operating in a school zone during a school day (e.g., during school hours). Based on an operation in the school zone during school hours, the vehicle computing system may select a frequency (or set/range of frequencies) of warning signal 308 that may be audibly appealing to (e.g., catch the attention of) school children.

In various examples, based on a determination that objects 306 and/or objects 306 of a particular type are no longer detected proximate to the vehicle 304(1), the vehicle computing system may determine to not emit the warning signal 308.

FIG. 3B is an illustration of an environment 302 in which the dynamic sound emission system may determine to not emit a warning signal, such as warning signal 308, based at least in part on a lack of objects, such as objects 306, and/or a lack of a particular type of objects detected in the environment 302.

In the illustrative example of FIG. 3B, the environment 302 includes a highway-type environment in which the vehicle 304(1) and another vehicle 304(2) may operate. In some examples, based on a determination that no objects exist in the environment 302, the vehicle computing system of the vehicle 304(1) may determine to not emit the warning signal. In some examples, the environment 302 may include objects classified as cars, motorcycles, trucks, and/or other motorized or electric vehicles configured for travel on a roadway. In such examples, based on a determination that no objects classified as pedestrians, bicyclists, scooters, or other objects that are self-powered are present in the environment 302, the vehicle computing device may determine to not emit the warning signal.

In some examples, a determination to not emit the warning signal may be based at least in part on a speed associated with the vehicle 304(1). In such examples, the vehicle computing device may determine that the speed of the vehicle has increased above an upper threshold value (e.g., 50 miles per hour, 60 miles per hour, 65 miles per hour, etc.) or decreased below a lower threshold value (e.g., 15 miles per hour, 10 miles per hour, 7 miles per hour, etc.), the vehicle computing device may determine to not emit the warning signal. In some examples, the upper threshold value may be determined based on a probability (e.g., likelihood) of conflict with an object and/or presence of a potentially conflicting object. In some examples, the lower threshold value may be determined based on a distance required to stop the vehicle 304(1) at maximum (e.g., emergency) braking. For example, the vehicle computing device may determine that on a road in which the vehicle 304(1) may travel at 55 miles per hour, a likelihood of detecting objects classified as pedestrians is below a threshold likelihood. Accordingly, the vehicle computing device may determine to not emit the warning signal. For another example, the vehicle computing device may determine that the speed of the vehicle 304(1) has slowed below 10 miles per hour (e.g., a lower threshold speed). Based on a determination that the vehicle is below the lower threshold speed, the vehicle computing device may determine to not emit the warning signal.

Figure 4:
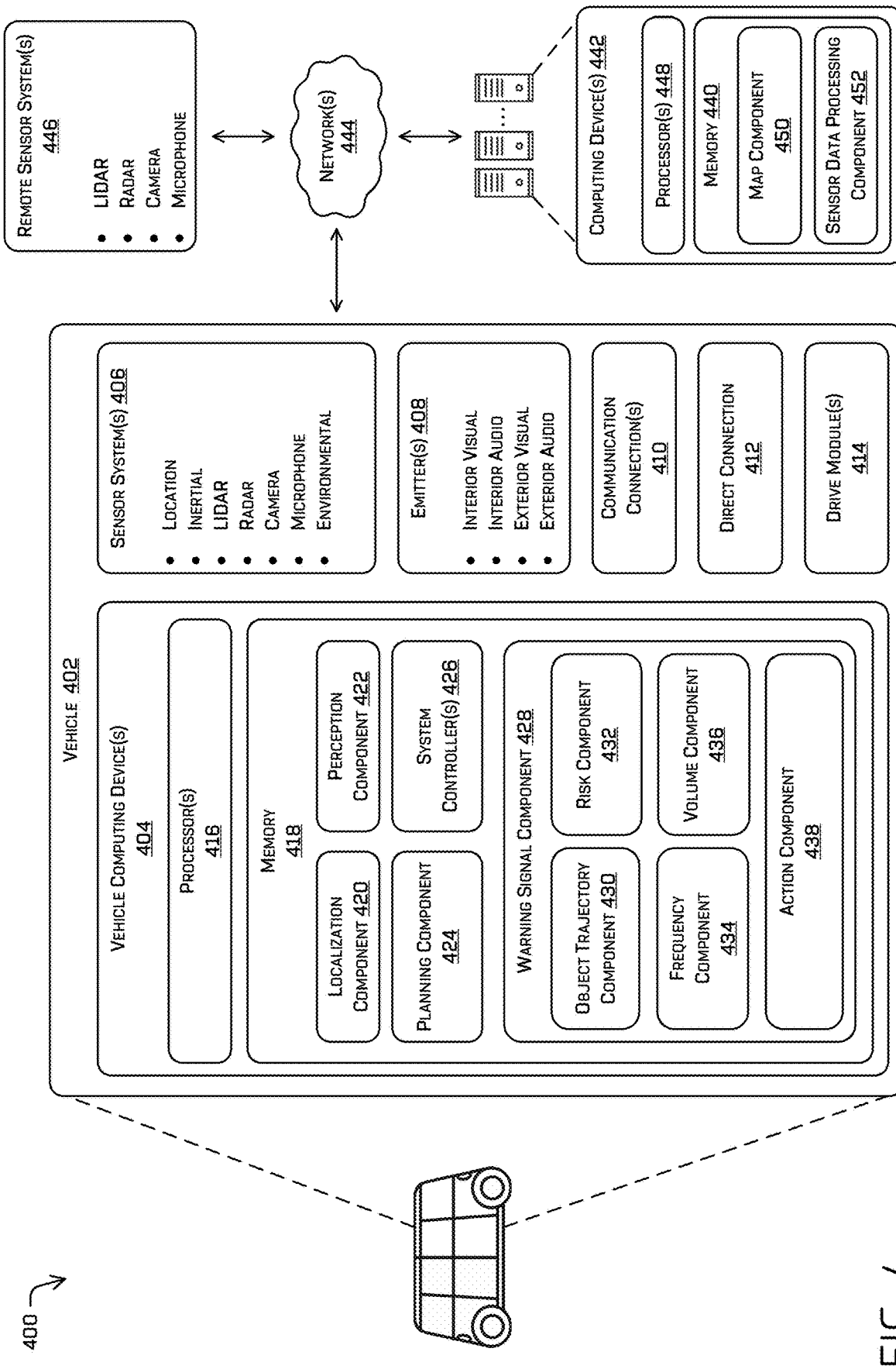
FIG. 4 is a block diagram of an example system for implementing the techniques described herein.

FIG. 4 is a block diagram of an example system 400 for implementing the techniques described herein. In at least one example, the system 400 may include a vehicle 402, such as vehicle 102.

The vehicle 402 may include one or more vehicle computing devices 404 (e.g., vehicle computing system), one or more sensor systems 406, one or more emitters 408, one or more communication connections 410, at least one direct connection 412, and one or more drive modules 414.

The vehicle computing device(s) 404 may include one or more processors 416 and memory 418 communicatively coupled with the one or more processors 416. In the illustrated example, the vehicle 402 is an autonomous vehicle; however, the vehicle 402 could be any other type of vehicle, such as a semi-autonomous vehicle, or any other system having at least an image capture device (e.g., a camera enabled smartphone). In the illustrated example, the memory 418 of the vehicle computing device(s) 404 stores a localization component 420, a perception component 422, a planning component 424, one or more system controllers 426, and a warning signal component 428 including an object trajectory component 430, a risk component 432, a frequency component 434, a volume component 436, and an action component 438. Though depicted in FIG. 4 as residing in the memory 418 for illustrative purposes, it is contemplated that the localization component 420, a perception component 422, a planning component 424, one or more system controllers 426, and a warning signal component 428 including an object trajectory component 430, a risk component 432, a frequency component 434, a volume component 436, and an action component 438 may additionally, or alternatively, be accessible to the vehicle 402 (e.g., stored on, or otherwise accessible by, memory remote from the vehicle 402, such as, for example, on memory 440 of a remote computing device 442).

In at least one example, the localization component 420 may include functionality to receive data from the sensor system(s) 406 to determine a position and/or orientation of the vehicle 402 (e.g., one or more of an x-, y-, z-position, roll, pitch, or yaw). For example, the localization component 420 may include and/or request/receive one or more map(s) of an environment and may continuously determine a location and/or orientation of the autonomous vehicle within the map(s). For the purpose of this discussion, a map may be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map may include, but is not limited to: texture information (e.g., color information (e.g., RGB color information, Lab color information, HSV/HSL color information), and the like), intensity information (e.g., lidar information, radar information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In at least one example, a map may include a three-dimensional mesh of the environment. In some examples, the vehicle 402 may be controlled based at least in part on the map(s). That is, the map(s) may be additionally used in connection with the perception component 422 and/or the planning component 424 to determine a location of the vehicle 402, detect objects in an environment, and/or generate routes and/or trajectories to navigate within an environment.

In some examples, the one or more maps may be stored on a remote computing device(s) (such as the computing device(s) 442) accessible via network(s) 444. In some examples, multiple maps may be stored based on, for example, a characteristic (e.g., type of entity, time of day, day of week, season of the year, etc.). Storing multiple maps may have similar memory requirements but increase the speed at which data in a map may be accessed.

In various examples, the localization component 420 may be configured to utilize SLAM (simultaneous localization and mapping), CLAMS (calibration, localization and mapping, simultaneously), relative SLAM, bundle adjustment, non-linear least squares optimization, or the like to receive image data, lidar data, radar data, IMU data, GPS data, wheel encoder data, and the like to accurately determine a location of the vehicle 402. In some instances, the localization component 420 may provide data to various components of the vehicle 402 to determine an initial position of an autonomous vehicle for determining a likelihood (e.g., probability) of conflict with an object, as discussed herein.

In some examples, the perception component 422 may include functionality to perform object detection, segmentation, and/or classification. In some examples, the perception component 422 may provide processed sensor data that indicates a presence of an object (e.g., entity, dynamic object) that is proximate to the vehicle 402 and/or a classification of the object as an object type (e.g., car, pedestrian, cyclist, dog, cat, deer, unknown, etc.). In some examples, the perception component 422 may provide processed sensor data that indicates a presence of a stationary entity that is proximate to the vehicle 402 and/or a classification of the stationary entity as a type (e.g., building, tree, road surface, curb, sidewalk, unknown, etc.). In additional or alternative examples, the perception component 422 may provide processed sensor data that indicates one or more characteristics associated with a detected object (e.g., a tracked object) and/or the environment in which the object is positioned. In some examples, characteristics associated with an object may include, but are not limited to, an x-position (global and/or local position), a y-position (global and/or local position), a z-position (global and/or local position), an orientation (e.g., a roll, pitch, yaw), an object type (e.g., a classification), a velocity of the object, an acceleration of the object, an extent of the object (size), etc. Characteristics associated with the environment may include, but are not limited to, a presence of another object in the environment, a state of another object in the environment, a time of day, a day of a week, a season, a weather condition (e.g., rain, sleet, hail, snow, temperature, humidity, etc.), an indication of darkness/light, etc.

In general, the planning component 424 may determine a path for the vehicle 402 to follow to traverse through an environment. For example, the planning component 424 may determine various routes and trajectories and various levels of detail. For example, the planning component 424 may determine a route to travel from a first location (e.g., a current location) to a second location (e.g., a target location). For the purpose of this discussion, a route may include a sequence of waypoints for travelling between two locations. As non-limiting examples, waypoints include streets, intersections, global positioning system (GPS) coordinates, etc. Further, the planning component 424 may generate an instruction for guiding the vehicle 402 along at least a portion of the route from the first location to the second location. In at least one example, the planning component 424 may determine how to guide the vehicle 402 from a first waypoint in the sequence of waypoints to a second waypoint in the sequence of waypoints. In some examples, the instruction may be a trajectory, or a portion of a trajectory. In some examples, multiple trajectories may be substantially simultaneously generated (e.g., within technical tolerances) in accordance with a receding horizon technique, wherein one of the multiple trajectories is selected for the vehicle 402 to navigate.

In some examples, the planning component 424 may include a prediction component to generate predicted trajectories of objects in an environment. For example, a prediction component may generate one or more predicted trajectories for objects within a threshold distance from the vehicle 402. In some examples, a prediction component may measure a trace of an object and generate a trajectory for the object based on observed and predicted behavior.

In at least one example, the vehicle computing device(s) 404 may include one or more system controllers 426, which may be configured to control steering, propulsion, braking, safety, emitters, communication, and other systems of the vehicle 402. The system controller(s) 426 may communicate with and/or control corresponding systems of the drive module(s) 414 and/or other components of the vehicle 402.

As illustrated in FIG. 4, the vehicle computing device(s) 404 may include a warning signal component 428. The warning signal component 428 may include an object trajectory component 430 configured to determine trajectories of objects in the environment. An object trajectory may include a direction and/or speed the object may travel from a current position (e.g., at the time of perception) and/or based on a direction of travel. In some examples, the object trajectory component 430 may determine that an object is within a threshold distance (e.g., one block, 200 meters, 300 feet, etc.) of the vehicle 402. Based on the determination that the object is within the threshold distance to the vehicle, the object trajectory component 430 may determine the trajectories associated with the object.

In various examples, the object trajectory component 430 may receive trajectory data from a prediction component of the planning component 424. In some examples, the object trajectory component 430 may be configured to receive sensor data from the sensor system(s) 406 and/or object data corresponding to detected objects and/or particular types of objects (e.g., pedestrians, bicyclists, etc.) from the perception component 422. In such examples, the object trajectory component 430 may process the received data and measure a trace of an object in order to generate a trajectory for the object based on observed and predicted behavior.

The warning signal component 428 may include a risk component 432 configured to identify one or more objects in an environment that may potentially conflict with the vehicle 402 (e.g., potentially conflicting object(s)). As discussed above, a risk (e.g., probability, likelihood, etc.) of conflict may be based on a relationship between a determined vehicle trajectory and a determined object trajectory. In some examples, the risk may be determined based on a likelihood of the vehicle 402 and the potentially conflicting object occupying the same or a similar space in the environment at the same or a substantially similar time. In various examples, the risk of conflict may be based on a safety zone associated with the vehicle 402 as discussed above with regard to FIG. 2.

In various examples, the risk component 432 may receive object trajectory data from the object trajectory component 432 and/or the planning component. In some examples, the risk component 432 may receive location data and/or vehicle trajectory data from the localization component 420, the perception component 422, and/or the planning component 424. The risk component 432 may process the vehicle and object trajectory data to determine the risk of conflict between the vehicle 402 and an object.

In various examples, the frequency component 434 may be configured to determine one or more frequencies of a warning signal to emit. As discussed above, the frequencies may be determined based on a detection of objects in the environment, a detection of a particular type of object, a determination of a potentially conflicting object, a speed of the vehicle 402, an impression the warning signal may have on objects in the environment, locations and/or speeds of the detected objects in the environment, or the like. In various examples, the frequency component 434 may access a database of warning signal frequencies to determine the frequency and/or set of frequencies associated with the warning signal. In some examples, the database of warning signal frequencies may be stored on the memory 418. In some examples, the database of warning signal frequencies may be stored on a memory 440 of the remote computing device(s) 442 and accessible via the network(s) 444.

In various examples, the volume component 436 of the warning signal component 428 may determine one or more volumes of the warning signal. In some examples, the volume(s) may be based on a noise floor of the environment as perceived by the vehicle. In some examples, the volume(s) may be based on a noise floor as perceived by the potentially conflicting object to which the warning signal is directed. In some examples, the volume(s) may be additionally, or alternatively, based on a distance between the vehicle 402 and the potentially conflicting object. Furthermore, and as discussed above, the volume(s) may be based on one or more objects being detected in the environment, such as those located between the vehicle 402 and the potentially conflicting object, a speed of the vehicle, a type of object to which the warning signal is directed (e.g., car, pedestrian, etc.), a speed and/or location of the object relative to the potentially conflicting object, a condition associated with the object (e.g., pedestrian wearing headphones or earmuffs, a pedestrian having a conversation in person and/or on the phone, an operator of a convertible car, a hard-top car, a vehicle that generates a substantial amount of noise (e.g., semi-trailer truck, etc.), etc.).

In various examples, the action component 438 may, based on a determination of risk (e.g., high, medium, or low risk), determine to emit the warning signal. The warning signal may be emitted at the frequency (or set/range of frequencies) determined by the frequency component 434 and/or the volume(s) determined by the volume component 436. Based on the determination to emit a warning signal, the vehicle computing device(s) 404, such as through the sensor systems 406, may emit the warning signal. The warning signal may be emitted in a direction determined by the action component 438, such as directed in any angle up to and including 360 degrees around the vehicle 402. In various examples, the action component 438 may be configured to cause multiple warning signals to be emitted in multiple directions. For example, the warning signal component 428 may identify two potentially conflicting objects. The warning signal component 428 may determine a risk associated with each of the potentially conflicting objects and may determine a frequency (or set/range of frequencies) and/or volume (or set/range of volumes) of each warning signal to emit based at least in part on the risk associated therewith. The action component 438 may cause the respective warning signals to be emitted in respective directions of the potentially conflicting objects.

In various examples, the action component 438 may, based on the determination of risk (e.g., high, medium, or low risk), determine an action for the vehicle to take. The action may include slowing the vehicle to yield to the object, stopping the vehicle to yield to the object, changing lanes left, or changing lanes right. Based on the determined action, the vehicle computing device(s) 404, such as through the system controller(s) 426, may cause the vehicle to perform the action. In at least some examples, such an action may be based on the probability of collision, as described in detail above.

As can be understood, the components discussed herein (e.g., the localization component 420, the perception component 422, the planning component 424, the one or more system controllers 426, the warning signal component 428 including the object trajectory component 430, the risk component 432, the frequency component 434, the volume component 436, and the action component 438 are described as divided for illustrative purposes. However, the operations performed by the various components may be combined or performed in any other component.

In some instances, aspects of some or all of the components discussed herein may include any models, techniques, and/or machine learning techniques. For example, in some instances, the components in the memory 418 (and the memory 440, discussed below) may be implemented as a neural network. As described herein, an exemplary neural network is a biologically inspired technique which passes input data through a series of connected layers to produce an output. Each layer in a neural network may also comprise another neural network, or may comprise any number of layers (whether convolutional or not). As can be understood in the context of this disclosure, a neural network may utilize machine learning, which may refer to a broad class of such techniques in which an output is generated based on learned parameters.

In some examples, the vehicle computing device(s) 404 may utilize machine learning techniques to determine one or more volumes and/or one or more frequencies of noises emitted by identified (e.g., perceived, classified, etc.) objects. In some examples, one or more data models may be trained to determine a noise emitted by an identified object based on one or more conditions in the environment. The condition(s) may include terrain features, a road condition (e.g., gravel, smooth pavement, etc.), speed and/or acceleration of the identified object, weather conditions, or the like. In various examples, the data model(s) may be trained to output a noise (e.g., noise level, an number of decibels, etc.) emitted by an object based at least in part on the condition(s) present in the environment.

Although discussed in the context of neural networks, any type of machine learning may be used consistent with this disclosure. For example, machine learning techniques may include, but are not limited to, regression techniques (e.g., ordinary least squares regression (OLSR), linear regression, logistic regression, stepwise regression, multivariate adaptive regression splines (MARS), locally estimated scatterplot smoothing (LOESS)), instance-based techniques (e.g., ridge regression, least absolute shrinkage and selection operator (LASSO), elastic net, least-angle regression (LARS)), decisions tree techniques (e.g., classification and regression tree (CART), iterative dichotomiser 3 (ID3), Chi-squared automatic interaction detection (CHAID), decision stump, conditional decision trees), Bayesian techniques naïve Bayes, Gaussian naïve Bayes, multinomial naïve Bayes, average one-dependence estimators (AODE), Bayesian belief network (BNN), Bayesian networks), clustering techniques (e.g., k-means, k-medians, expectation maximization (EM), hierarchical clustering), association rule learning techniques (e.g., perceptron, back-propagation, hopfield network, Radial Basis Function Network (RBFN)), deep learning techniques (e.g., Deep Boltzmann Machine (DBM), Deep Belief Networks (DBN), Convolutional Neural Network (CNN), Stacked Auto-Encoders), Dimensionality Reduction Techniques (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Techniques (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet70, ResNet101, VGG, DenseNet, PointNet, and the like.

In at least one example, the sensor system(s) 406 may include lidar sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, time of flight, etc.), microphones, wheel encoders, environment sensors (e.g., temperature sensors, humidity sensors, light sensors, pressure sensors, etc.), etc. The sensor system(s) 406 may include multiple instances of each of these or other types of sensors. For instance, the lidar sensors may include individual lidar sensors located at the corners, front, back, sides, and/or top of the vehicle 402. As another example, the camera sensors may include multiple cameras disposed at various locations about the exterior and/or interior of the vehicle 402. The sensor system(s) 406 may provide input to the vehicle computing device(s) 404. Additionally or alternatively, the sensor system(s) 406 may send sensor data, via the one or more networks 444, to the one or more computing device(s) 442 at a particular frequency, after a lapse of a predetermined period of time, in near real-time, etc.

The vehicle 402 may also include one or more emitters 408 for emitting light and/or sound, as described above. The emitters 408 in this example include interior audio and visual emitters to communicate with passengers of the vehicle 402. By way of example and not limitation, interior emitters may include speakers, lights, signs, display screens, touch screens, haptic emitters (e.g., vibration and/or force feedback), mechanical actuators (e.g., seatbelt tensioners, seat positioners, headrest positioners, etc.), and the like. The emitters 408 in this example also include exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which comprising acoustic beam steering technology.

The vehicle 402 may also include communication connection(s) 410 that enable communication between the vehicle 402 and one or more other local or remote computing device(s) 442. For instance, the communication connection(s) 410 may facilitate communication with other local computing device(s) on the vehicle 402 and/or the drive module(s) 414. Also, the communication connection(s) 410 may allow the vehicle to communicate with other nearby computing device(s) (e.g., computing device(s) 442, other nearby vehicles, etc.) and/or one or more remote sensor system(s) 446 for receiving sensor data.

The communications connection(s) 410 may include physical and/or logical interfaces for connecting the vehicle computing device(s) 404 to another computing device or a network, such as network(s) 444. For example, the communications connection(s) 410 can enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.) or any suitable wired or wireless communications protocol that enables the respective computing device to interface with the other computing device(s).

In at least one example, the vehicle 402 may include one or more drive modules 414. In some examples, the vehicle 402 may have a single drive module 414. In at least one example, if the vehicle 402 has multiple drive modules 414, individual drive modules 414 may be positioned on opposite ends of the vehicle 402 (e.g., the front and the rear, etc.). In at least one example, the drive module(s) 414 may include one or more sensor systems to detect conditions of the drive module(s) 414 and/or the surroundings of the vehicle 402. By way of example and not limitation, the sensor system(s) may include one or more wheel encoders (e.g., rotary encoders) to sense rotation of the wheels of the drive modules, inertial sensors (e.g., inertial measurement units, accelerometers, gyroscopes, magnetometers, etc.) to measure orientation and acceleration of the drive module, cameras or other image sensors, ultrasonic sensors to acoustically detect objects in the surroundings of the drive module, lidar sensors, radar sensors, etc. Some sensors, such as the wheel encoders may be unique to the drive module(s) 414. In some cases, the sensor system(s) on the drive module(s) 414 may overlap or supplement corresponding systems of the vehicle 402 (e.g., sensor system(s) 406).

The drive module(s) 414 may include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive module(s) 414 may include a drive module controller which may receive and preprocess data from the sensor system(s) 406 and to control operation of the various vehicle systems. In some examples, the drive module controller may include one or more processors and memory communicatively coupled with the one or more processors. The memory 418 may store one or more modules to perform various functionalities of the drive module(s) 414. Furthermore, the drive module(s) 414 may also include one or more communication connection(s) that enable communication by the respective drive module with one or more other local or remote computing device(s) 442.

In at least one example, the direct connection 412 may provide a physical interface to couple the one or more drive module(s) 414 with the body of the vehicle 402. For example, the direct connection 412 may allow the transfer of energy, fluids, air, data, etc. between the drive module(s) 414 and the vehicle. In some instances, the direct connection 412 may further releasably secure the drive module(s) 414 to the body of the vehicle 402.

In at least one example, the localization component 420, the perception component 422, the planning component 424, the one or more system controllers 426, and the warning signal component 428 and various components thereof, may process sensor data, as described above, and may send their respective outputs, over the one or more network(s) 444, to the computing device(s) 442. In at least one example, the localization component 420, the perception component 422, the planning component 424, the one or more system controllers 426, and the warning signal component 428 may send their respective outputs to the computing device(s) 442 at a particular frequency, after a lapse of a predetermined period of time, in near real-time, etc.

In some examples, the vehicle 402 may send sensor data to the computing device(s) 442 via the network(s) 444. In some examples, the vehicle 402 may receive sensor data from the computing device(s) 442 via the network(s) 444. The sensor data may include raw sensor data and/or processed sensor data and/or representations of sensor data. In some examples, the sensor data (raw or processed) may be sent and/or received as one or more log files.

The computing device(s) 442 may include processor(s) 448 and a memory 440 storing a map component 450 and a sensor data processing component 452. In some examples, the map component 450 may include functionality to generate maps of various resolutions. In such examples, the map component 450 may send one or more maps to the vehicle computing device(s) 404 for navigational purposes. In various examples, the sensor data processing component 452 may be configured to receive data from one or more remote sensors, such as sensor systems 406 and/or remote sensor system(s) 446. In some examples, the sensor data processing component 452 may be configured to process the data and send processed sensor data to the vehicle computing device(s) 404, such as for use by the warning signal component 428. In some examples, the sensor data processing component 452 may be configured to send raw sensor data to the vehicle computing device(s) 404.

The processor(s) 416 of the vehicle 402 and the processor(s) 448 of the computing device(s) 442 may be any suitable processor capable of executing instructions to process data and perform operations as described herein. By way of example and not limitation, the processor(s) 416 and 448 may comprise one or more Central Processing Units (CPUs), Graphics Processing Units (GPUs), or any other device or portion of a device that processes electronic data to transform that electronic data into other electronic data that may be stored in registers and/or memory. In some examples, integrated circuits (e.g., ASICs, etc.), gate arrays (e.g., FPGAs, etc.), and other hardware devices may also be considered processors in so far as they are configured to implement encoded instructions.

Memory 418 and 440 are examples of non-transitory computer-readable media. The memory 418 and 440 may store an operating system and one or more software applications, instructions, programs, and/or data to implement the methods described herein and the functions attributed to the various systems. In various implementations, the memory may be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

In some instances, the memory 418 and 440 may include at least a working memory and a storage memory. For example, the working memory may be a high-speed memory of limited capacity (e.g., cache memory) that is used for storing data to be operated on by the processor(s) 416 and 440. In some instances, the memory 418 and 440 may include a storage memory that may be a lower-speed memory of relatively large capacity that is used for long-term storage of data. In some cases, the processor(s) 416 and 440 cannot operate directly on data that is stored in the storage memory, and data may need to be loaded into a working memory for performing operations based on the data, as discussed herein.

It should be noted that while FIG. 4 is illustrated as a distributed system, in alternative examples, components of the vehicle 402 may be associated with the computing device(s) 442 and/or components of the computing device(s) 442 may be associated with the vehicle 402. That is, the vehicle 402 may perform one or more of the functions associated with the computing device(s) 442, and vice versa.

FIGS. 5-9 illustrate example processes in accordance with embodiments of the disclosure. These processes are illustrated as logical flow graphs, each operation of which represents a sequence of operations that may be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations may be combined in any order and/or in parallel to implement the processes.

Figure 5:
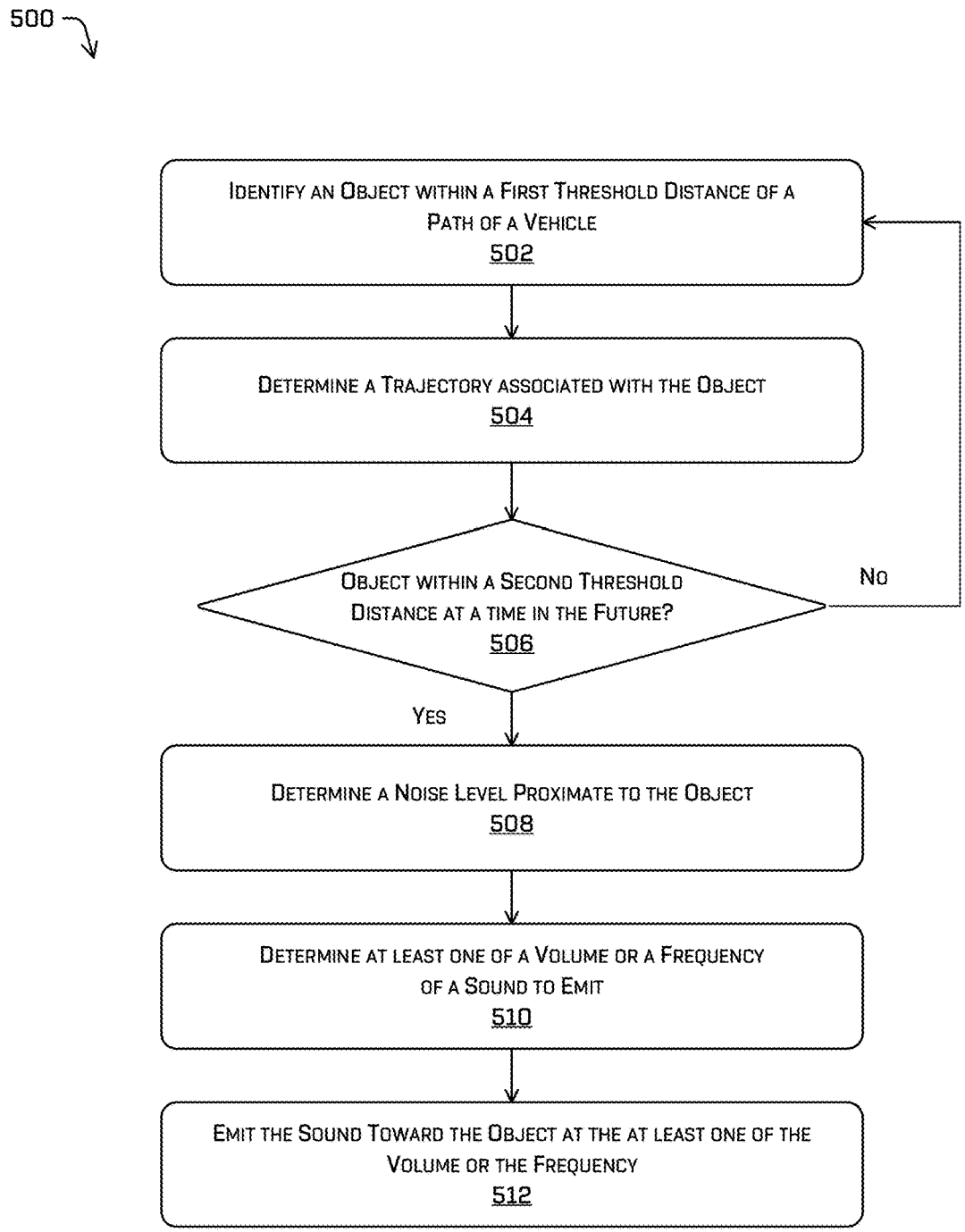
FIG. 5 depicts an example process for determining at least one of a volume or a frequency of a sound to emit toward an object, in accordance with embodiments of the disclosure.

FIG. 5 depicts an example process 500 for determining at least one of a volume or a frequency of a warning sound to emit toward an object, in accordance with embodiments of the disclosure. For example, some or all of the process 500 may be performed by one or more components in FIG. 4, as described herein. For example, some or all of the process 500 may be performed by the vehicle computing device(s) 404.

At operation 502, the process may include identifying an object within a first threshold distance of a path of the vehicle. In various examples, an identification may include a vehicle computing system detecting the object, such as by processing sensor data received from one or more sensors to determine that the object is present in the environment. In some examples, the identification of the object may include determining a classification (e.g., type) of the object.

In various examples, the first threshold distance (e.g., 1 block, 4 blocks, 400 meters, ½ mile, etc.) may be a pre-determined distance from the vehicle. In some examples, the first threshold distance may be determined based on a speed in which the vehicle is operating, a number of objects present in the environment, one or more types (e.g., classes) of objects present in the environment, a zone in which the vehicle is operating (e.g., school zone, construction zone, etc.), and/or other factors that could affect the warning signal determination.

At operation 504, the process may include determining a trajectory associated with the object. As discussed above, the vehicle computing system may process sensor data received from the sensor(s). The vehicle computing system may be configured to determine the trajectory of the object based on observed and/or predicted behaviors. The trajectory of the object may include a direction, velocity and/or acceleration of the object. In some examples, trajectory may be based, at least in part on a classification of the object.

At operation 506, the process may include determining whether the object will be within a second threshold distance of the vehicle at a time in the future. In some examples, the vehicle computing device may determine a distance between the vehicle and the object at the time in the future based on a comparison of trajectory of the vehicle and the trajectory of the object. In various examples, the second threshold distance may be a pre-defined distance (e.g., 3 meters, 5 meters, 15 feet, 25 feet, etc.). In some examples, the second threshold distance may include a distance related to an intersection (i.e., 0 feet) between the trajectory of the vehicle and the trajectory of the object at a same or similar time in the future. In some examples, the second threshold distance may be determined based on a speed at which the vehicle is operating, a speed of the object, a number of objects present in the environment, one or more types of objects present in the environment, a zone in which the vehicle is operating, or the like. In various examples, the second threshold distance may be determined based on a likelihood (e.g., probability) of conflict between the vehicle and the object.

Based on a determination that the object will not be within the second threshold distance of the vehicle at the time in the future (e.g., "No" at 506), the vehicle computing system may return to operation 502 and identify another object within the first threshold distance of a path of the vehicle.

Based on a determination that the object will be within the second threshold distance of the vehicle at the time in the future (e.g., "Yes" at 506), the process may continue to operation 508, which may include determining a noise level proximate to the object. As discussed above, the noise level proximate to the object may be determined based on one or more other noise generating objects (e.g., dynamic and/or non-dynamic) located proximate to the object. In some examples, the noise level may be determined based at least in part on a baseline noise level detected by the vehicle computing system in the environment. In various examples, the vehicle computing device may determine the noise level by extrapolating distinct and non-distinct noise events detected by sensors of the vehicle based on a first distance between the noise generating object(s) and the vehicle and a second distance between the noise generating object(s) and the object.

At operation 510, the process may include determining at least one of a volume or a frequency of a sound to emit. In some examples, the vehicle computing system may acquire sounds in the form of a Fourier analysis to determine the at least one of the volume or the frequency of the sound to emit. In various examples, the vehicle computing system may determine one or more volumes and/or one or more frequencies of a sound (e.g., warning signal) to emit. In such examples, the warning signal may include a variable frequency and/or variable amplitude audio signal.

As discussed above, the volume(s) and/or frequencies may be determined based on various factors in the environment, such as a noise floor proximate to the object, a noise floor in the environment, a speed the vehicle is operating, type(s) of object(s) present in the environment, a number of objects present in the environment, presence of a second object being located between the object and the vehicle in the environment, or the like. In some examples, the at least one of the volume(s) and/or frequencies may be determined based on an urgency of the warning signal to be emitted, a likelihood of conflict, or the like.

At operation 512, the process may include emitting the sound toward the object at the at least one of the volume (or set/range of volumes) or the frequency (or set/range of frequencies). In various examples, the vehicle computing system may cause the sound to be emitted via one or more speakers coupled to the vehicle. In some examples, the sound may be emitted in a directed toward the object, such as in a directed audio beam. In some examples, the sound may be emitted at an angle up to and including 360 degrees around the vehicle.

Figure 6:
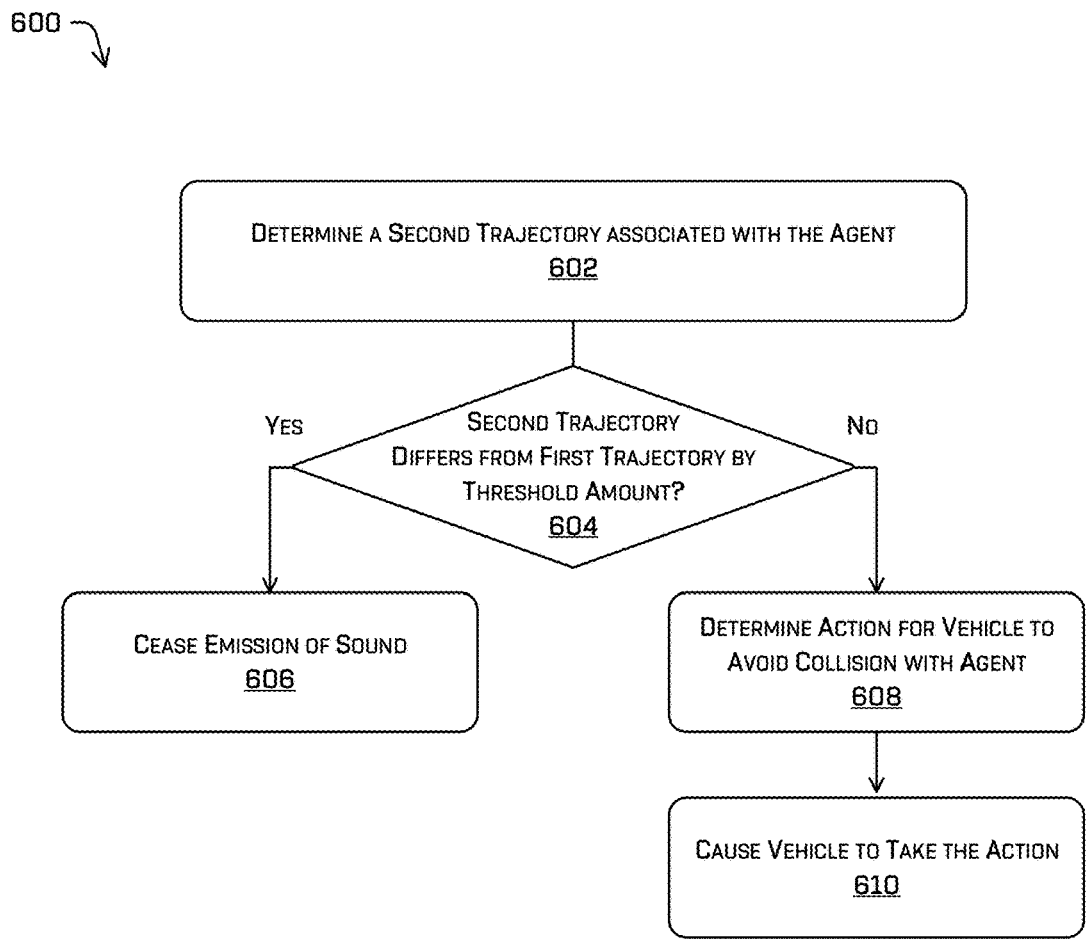
FIG. 6 depicts an example process for determining whether an emission of sound was effective and, based on the effectiveness of the sound, ceasing emission of the sound or causing the vehicle to take an action to avoid a collision with the object, in accordance with embodiments of the disclosure.

FIG. 6 depicts an example process 600 for determining whether an emission of sound, such as that described in FIG. 5, was effective and, based on the effectiveness of the sound, ceasing emission of the sound or causing the vehicle to take an action to avoid a collision with the object, in accordance with embodiments of the disclosure. For example, some or all of the process 600 may be performed by one or more components in FIG. 4, as described herein. For example, some or all of the process 600 may be performed by the vehicle computing device(s) 404.

At operation 602, the process may include determining a second trajectory associated with the object. The second trajectory, similar to the trajectory described at operation 504 of FIG. 5, may be determined by processing sensor data received from the sensor(s). The second trajectory of the object may include a direction, velocity, and/or acceleration of the object.

At operation 604, the process may include determining whether the second trajectory differs from the first trajectory by a threshold amount (e.g., value). In various examples, the trajectories may differ in speed and/or direction. In such examples, the threshold amount may include an amount of speed change (e.g., 3 miles per hour to 1 mile per hour, 5 miles per hour to 0 miles per hour, etc.) and/or a change in direction (e.g., adjusted angle above a threshold angle (e.g., 15 degrees, 25 degrees, etc.), etc.). In various examples, the threshold amount may correspond to a determination that the object will not be within the second threshold distance of the path of the vehicle at a time in the future, as described above with regard to operation 506 of FIG. 5. In some examples, the threshold amount may correspond to a likelihood (e.g., probability) of conflict between the vehicle and the object being below a threshold level (e.g., threshold probability) of conflict.

If the second trajectory differs from the first trajectory by the threshold amount (e.g., "yes" in the operation 604), the process continues to operation 606. At operation 606, the process may include ceasing emission of the sound.

If the second trajectory does not differ from the first trajectory by the threshold amount (e.g., "no" in the operation 604), the process continues to operation 608. At operation 608, the process may include determining an action for the vehicle to take to avoid a collision with the object. The action may include determining to emit a second warning signal and/or causing the vehicle to alter the vehicle trajectory to avoid the collision. The second warning signal may include a volume (or set/range of volumes) and/or frequency (or set/range of frequencies) associated with a warning signal of increased urgency (e.g., low urgency alert elevated to high urgency warning, low probability of conflict elevated to medium and/or high probability of conflict). An change (e.g., adjustment, alteration, etc.) to the vehicle trajectory may include slowing or stopping the vehicle and/or changing the vehicle path, such as a lane change right or left, altering a position in a current lane, swerving left or right, such as into a shoulder of the roadway, or the like.

At operation 610, the process may include causing the vehicle to take the action. In various examples, the vehicle computing system may cause the second warning signal to be emitted from the speaker(s) coupled to the vehicle. In some examples, the vehicle computing device may cause the vehicle, such as via the drive module 414 of FIG. 4, to take the action.

Figure 7:
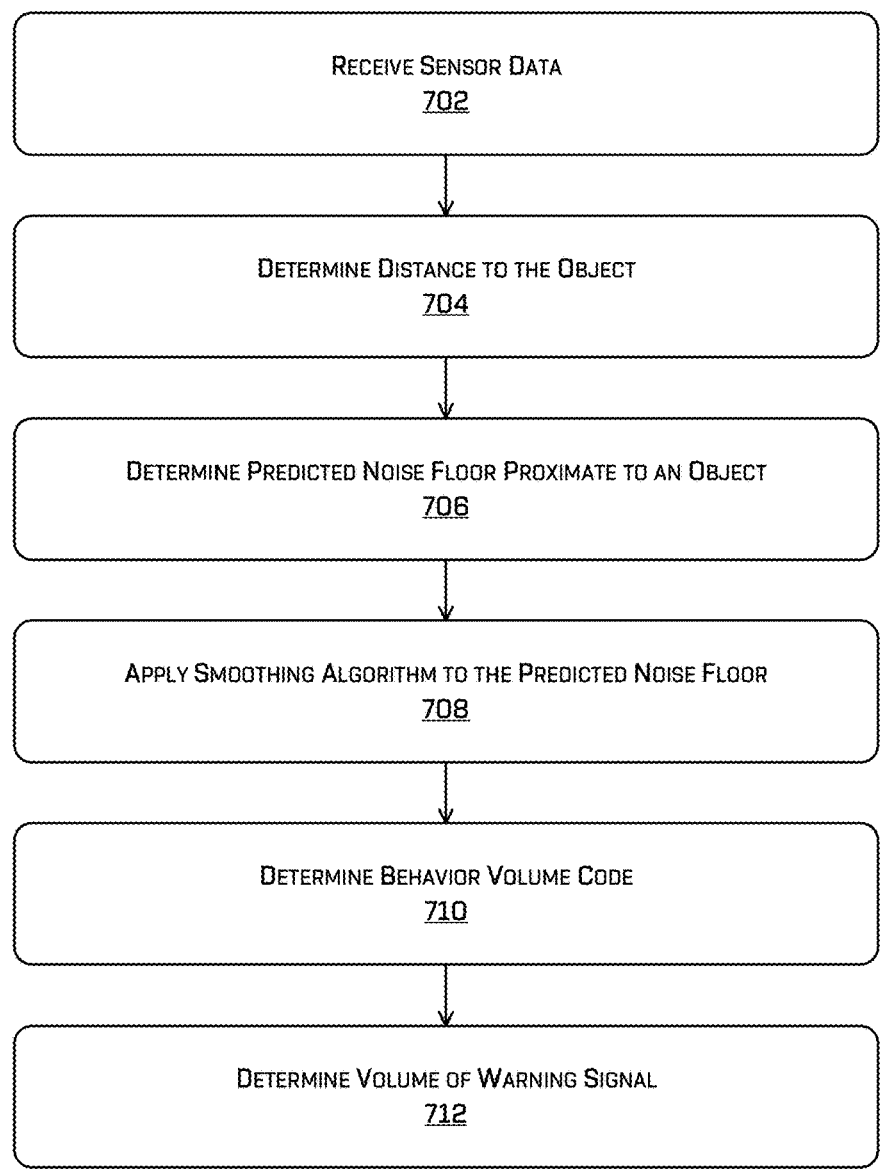
FIG. 7 depicts an example process for determining a volume of a sound to emit toward an object, in accordance with embodiments of the disclosure.

FIG. 7 depicts an example process 700 for determining a volume of a sound to emit toward an object, in accordance with embodiments of the disclosure. For example, some or all of the process 700 may be performed by one or more components in FIG. 4, as described herein. For example, some or all of the process 700 may be performed by the vehicle computing device(s) 404.

At operation 702, the process may include receiving sensor data from one or more sensors. The sensor(s) may include sensor(s) coupled to a vehicle and/or remote sensor(s) in an environment. Based on the sensor data, a vehicle computing system may detect and/or identify a potentially conflicting object in the environment.

At operation 704, the process may include determining a distance to the potentially conflicting object from the vehicle. The distance to the potentially conflicting object may be determined based on at least some of the sensor data received at operation 702.

At operation 706, the process may include determining a predicted noise floor proximate to the object. As discussed above, the noise floor proximate to the potentially conflicting object may be determined based on a detection of one or more noise-producing objects proximate to the potentially conflicting object. In some examples, the noise floor proximate to the potentially conflicting object may be based on distinct and non-distinct noise events occurring in the environment, classifications of proximate objects, relative distances and/or speeds to the proximate objects from the potentially conflicting object, a time of day, a location of the potentially conflicting object, and the like.

At operation 708, the process may include applying a smoothing algorithm to the predicted noise floor based on the distance to the object. In various examples, an application of the smoothing algorithm may include determining a gain associated with the environment. In various examples, the smoothing algorithm may adjust an effect of distinct noise events to the noise floor proximate to the object.

At operation 710, the process may include determining a behavior volume code associated with a warning signal. The behavior volume code may be based on an urgency of the warning, a likelihood of conflict, or the like. In some examples, each behavior volume code may be associated with a range of volumes. For example, a behavior volume code may include an emergency volume range of 39-44 decibels above the noise floor, a friendly but clear and intentional volume range of 16-25 decibels above the noise floor, and an audible but subtle (e.g., subliminal) alert volume range of 2-9 decibels above the noise floor.

At operation 712, the process may include determining a volume (or set and/or range of volumes) of warning signal to emit. In various examples, the volume(s) may be determined based on the input of the smoothed noise floor proximate to the object (post smoothing algorithm) based on the distance to the object and the determined behavior volume code.

Figure 8:
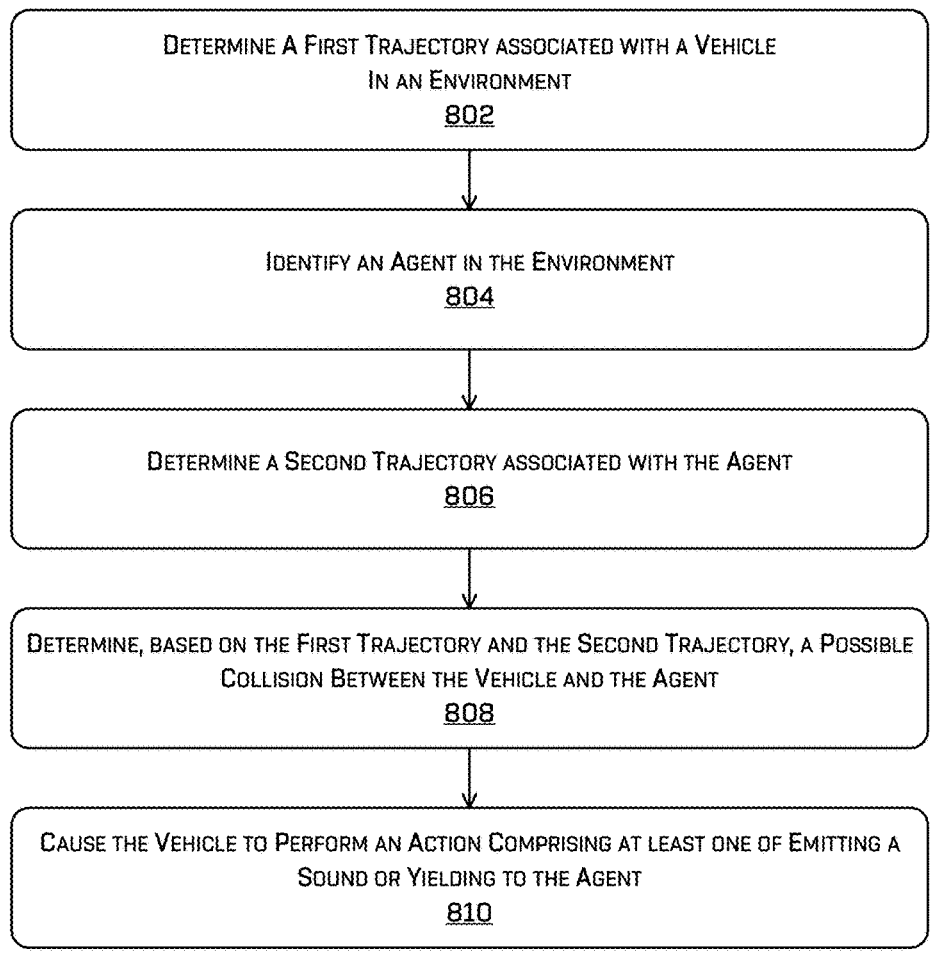
FIG. 8 depicts an example process for avoiding a collision between a vehicle and an object in an environment by emitting a sound and/or causing the vehicle to take an action to avoid the collision, in accordance with embodiments of the disclosure.

FIG. 8 depicts an example process 800 for avoiding a collision between a vehicle and an object in an environment by emitting a sound and/or causing the vehicle to take an action to avoid the collision, in accordance with embodiments of the disclosure. For example, some or all of the process 800 may be performed by one or more components in FIG. 4, as described herein. For example, some or all of the process 800 may be performed by the vehicle computing device(s) 404.

At operation 802, the process may include determining a first trajectory associated with the vehicle in the environment. The first trajectory associated with the vehicle may include a velocity and/or acceleration of the vehicle along a vehicle path (e.g., direction of the vehicle). The first trajectory may be determined based on sensor data received from the sensor(s) and/or a planned path, velocity, and/or acceleration of the vehicle, such as that stored in a database of the vehicle computing system and sent to a drive module of the vehicle for execution.

At operation 804, the process may include identifying an object in the environment. As discussed above, a vehicle computing system may detect and identify (e.g., classify) the object based on sensor data received from one or more sensors.

At operation 806, the process may include determining a second trajectory associated with the object. The vehicle computing system may determine the second trajectory based on the sensor data received from the sensor(s). The second trajectory may include a direction, velocity, and/or acceleration of the object.

At operation 808, the process may include determining, based on the first trajectory and the second trajectory, a possible collision between the vehicle and the object. The possible collision may include a probability (e.g., likelihood) of conflict between the vehicle and the object. In various examples, the vehicle computing device may determine that a possible collision may exist based on a determination that the vehicle on the first trajectory and the object on the second trajectory will be within a threshold distance of one another at a time in the future.

At operation 810, the process may include causing the vehicle to perform an action comprising at least one of emitting a sound (e.g., warning signal) or yielding to the object. In various examples, the vehicle computing system may determine one or more volumes and/or one or more frequencies of the sound to emit. In such examples, the volumes and/or frequencies of the sound may be determined based on an urgency of the warning signal, a probability of collision, a velocity and/or acceleration associated with the vehicle and/or the object, or the like.

As discussed above, the action may include yielding to the object, such as by slowing or stopping the vehicle, changing lanes left or right, swerving away from the object, or the like. As discussed above with regard to FIG. 2, a determination to perform the action may be based on a future location of the potentially conflicting object being within a safety zone associated with the vehicle. The vehicle computing device may determine the action based on a determination that a particular action may decrease the probability of collision below a threshold level (e.g., low probability).

Figure 9:
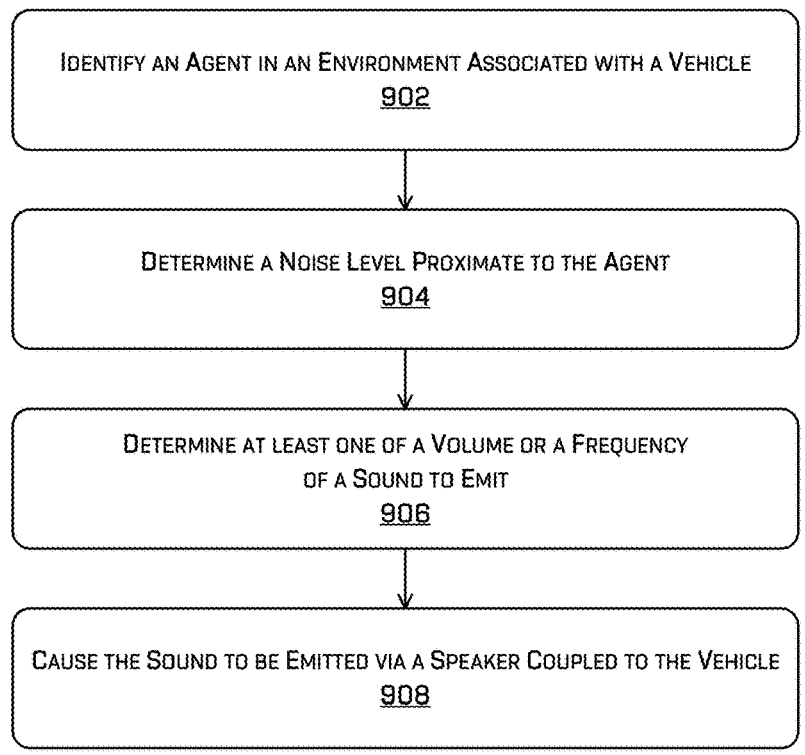
FIG. 9 depicts another example process for determining at least one of a volume or a frequency of a sound to emit toward an object, in accordance with embodiments of the disclosure

FIG. 9 depicts an example process 900 for determining at least one of a volume or a frequency of a warning sound to emit toward an object, in accordance with embodiments of the disclosure. For example, some or all of the process 900 may be performed by one or more components in FIG. 4, as described herein. For example, some or all of the process 900 may be performed by the vehicle computing device(s) 404.

At operation 902, the process may include identifying an object in an environment associated with a vehicle. In various examples, an identification may include a vehicle computing system detecting the object, such as by processing sensor data received from one or more sensors to determine that the object is present in the environment. In some examples, the identification of the object may include determining a classification (e.g., type) of the object.

At operation 904, the process may include determining a noise level proximate to the object. As discussed above, the noise level proximate to the object may be determined based on one or more other noise generating objects located proximate to the object. In some examples, the noise level may be determined based on a baseline noise level detected by the vehicle computing system in the environment. In various examples, the vehicle computing device may determine the noise level by extrapolating distinct and non-distinct noise events detected by sensors of the vehicle based on a first distance between the noise generating object(s) and the vehicle and a second distance between the noise generating object(s) and the object.

At operation 906, the process may include determining at least one of a volume (or set/range of volumes) or a frequency (or set/range of frequencies) of a sound to emit. In various examples, the vehicle computing system may determine one or more volumes and/or one or more frequencies of a sound (e.g., warning signal) to emit. In such examples, the warning signal may include a variable frequency and/or variable amplitude audio signal.

As discussed above, the volume(s) and/or frequencies may be determined based on various factors in the environment, such as a noise floor proximate to the object, a noise floor in the environment, a speed the vehicle is operating, type(s) of object(s) present in the environment, a number of objects present in the environment, presence of a second object being located between the object and the vehicle in the environment, or the like. In some examples, the at least one of the volume(s) and/or frequencies may be determined based on an urgency of the warning signal to be emitted, a likelihood of conflict, or the like.

At operation 908, the process may include causing the sound to be emitted via a speaker coupled to the vehicle at the at least one of the volume or the frequency. In various examples, the vehicle computing system may cause the sound to be emitted via one or more speakers coupled to the vehicle. In some examples, the sound may be emitted in a directed toward the object, such as in a directed audio beam. In some examples, the sound may be emitted at an angle up to and including 360 degrees around the vehicle.

EXAMPLE CLAUSES

A: A system comprising: a sensor coupled to a vehicle; a speaker coupled to the vehicle; one or more processors; and one or more computer-readable media storing instructions that, when executed, configure the system to: identify, based on sensor data from the sensor, an object in an environment associated with the vehicle; determine a noise level proximate to the object, wherein the noise level is based at least in part on noise events generated by one or more other objects located within a threshold distance of the object; determine, based at least in part on the noise level, at least one of a volume or a frequency of a sound to emit; and emit, via the speaker, the sound at the at least one of the volume or the frequency.

B: The system as paragraph A describes, wherein the instructions further cause the system to: determine a first range of frequencies corresponding to the noise events generated by the other objects, wherein the frequency is based at least in part on the first range of frequencies.

C: The system as either of paragraphs A or B describe, wherein the at least one of the volume or the frequency are determined based on machine learned outputs of noises emitted by identified objects proximate to the object.

D: The system as any of paragraphs A-C describe, wherein the sound is emitted in a beam formed audio signal directed toward the object.

E: The system as any of paragraphs A-C describe, wherein the instructions further cause the system to: determine, based on the sensor data, a first trajectory associated with the vehicle; determine, based on the sensor data, a second trajectory associated with the object; determine a potential conflict between the vehicle and the object based on the first trajectory and the second trajectory; determine an action to take to avoid the potential conflict; and cause the vehicle to take the action.

F: A computer-readable medium having thereon computer-executable instructions that, responsive to execution, configure a computer to perform a system as any of paragraphs A-E describe.

G: A method comprising: identifying, based on sensor data from a sensor coupled to a vehicle, an object in an environment associated with the vehicle; determining a noise level proximate to the object; determining, based at least in part on the noise level proximate to the object, at least one of a volume or a frequency of a sound to emit; and causing the sound to be emitted via a speaker at the at least one of the volume or the frequency.

H: The method as paragraph G describes, wherein the noise level is based on noise events generated within a threshold distance of the object, the method further comprising: determining a first range of frequencies corresponding to the noise level proximate to the object, wherein the frequency is based at least in part on the first range of frequencies.

I: The method as either of paragraphs G or H describe, wherein the object is a first object, the method further comprising: identifying a second object wherein determining the volume of the sound to emit is based at least in part on the second object.

J: The method as any of paragraphs G-I describe, further comprising: determining a speed of the vehicle traveling through the environment, wherein determining the at least one of the volume or the frequency is based at least in part on the speed of the vehicle.

K: The method as any of paragraphs G-J describe, further comprising: determining a trajectory associated with the object; and determining, based at least in part on the trajectory, a probability that the object will be within a threshold distance of the vehicle at a future time, wherein determining the at least one of the volume or the frequency of the sound to emit is based at least in part on the probability.

L: The method as any of paragraphs G-K describe, further comprising: determining a change in the trajectory associated with the object; determining, based at least in part on the change in the trajectory, to stop emitting the sound via the speaker.

M: The method as any of paragraphs G-L describe, wherein determining the at least one of the volume or the frequency is based in part on at least one of: an occupancy of the vehicle; a road condition; a location of the vehicle in the environment; a speed of the vehicle in the environment; a time of day in which the vehicle is operating; a day in a week in which the vehicle is operating; or a weather condition in the environment.

N: The method as any of paragraphs G-M describe, further comprising: determining a first trajectory associated with the object at a first time, wherein the first trajectory corresponds to a potential conflict between the vehicle and the object; determining a second trajectory associated with the object at a second time; determining that a difference between the first trajectory and the second trajectory is less than a threshold value; determining at least one of a second volume or a second frequency of a second sound to emit based at least in part on the difference between the first trajectory and the second trajectory being less than the threshold value; and causing the second sound to be emitted via the speaker at the at least one of the second volume or the second frequency.

O: The method as any of paragraphs G-N describe, further comprising: identify a classification associated with the object, wherein determining the at least one of the volume or the frequency of the sound to emit is based at least in part on the classification associated with the object.

P: A system or device comprising: a processor, and a computer-readable medium coupled to the processor, the computer-readable medium including instructions to configure the processor to perform a computer-implemented method as any of paragraphs G-O describe.

Q: A system or device comprising: a means for processing; and a means for storing coupled to the means for processing, the means for storing including instructions to configure one or more devices to perform a computer-implemented method as any of paragraphs G-O describe.

R: A computer-readable medium having thereon computer-executable instructions that, responsive to execution, configure a computer to perform a method as any one of paragraphs G-O describe.

S: One or more non-transitory computer-readable media storing instructions that, when executed, cause a vehicle to perform operations comprising: identifying, based on sensor data from a sensor coupled to the vehicle, an object in an environment associated with the vehicle; determining a noise level proximate to the object; determining, based at least in part on the noise level proximate to the object, at least one of a volume or a frequency of a sound to emit; and causing the sound to be emitted via a speaker coupled to the vehicle at the at least one of the volume or the frequency.

T: One or more non-transitory computer-readable media as paragraph S describes, wherein the noise level is determined based on: determining a first distance between the object and a first noise generating object proximate to the object; accessing a database of noises to determine a first noise associated with the first noise generating object; and determining a perceived noise level of the first noise by the object based at least in part on the first distance.

U: One or more non-transitory computer-readable media as paragraph T describes, wherein the noise level is further determined based on: determining a second distance between the object and a second noise generating object proximate to the object; accessing the database of noises to determine a second noise associated with the second noise generating object; determining a second perceived noise level of the second noise by the object based at least in part on the second distance; and combining the first noise and the second noise to determine the noise level proximate to the object.

V: One or more non-transitory computer-readable media as any of paragraphs S-U describe, the operations further comprising: determining a speed of the vehicle traveling through the environment, wherein determining the at least one of the volume or the frequency is based at least in part on the speed of the vehicle.

W: One or more non-transitory computer-readable media as any of paragraphs S-V describe, the operations further comprising: determining a trajectory associated with the object; and determining, based at least in part on the trajectory, a probability that the object will be within a threshold distance of the vehicle at a future time, wherein determining the at least one of the volume or the frequency of the sound to emit is based at least in part on the probability.

X: One or more non-transitory computer-readable media as paragraph W describes, wherein the sound is a first sound and the trajectory is a first trajectory associated with the object at a first time, the operations further comprising: determining a second trajectory associated with the object at a second time; determining, based at least in part on the second trajectory, a second probability that the object will be within a second threshold distance of the vehicle at a second future time; determining at least one of a second volume or a second frequency of a second sound to emit based at least in part on the second probability; and causing the second sound to be emitted via the speaker at the at least one of the second volume or the second frequency.

Y: A system or device comprising: a processor; and a one or more non-transitory computer-readable media as any of paragraphs S-W describe.

While the example clauses described above are described with respect to one particular implementation, it should be understood that, in the context of this document, the content of the example clauses may also be implemented via a method, device, system, a computer-readable medium, and/or another implementation.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A system comprising:
a sensor coupled to a vehicle;
a speaker coupled to the vehicle;
one or more processors; and
one or more computer-readable media storing instructions that, when executed, configure the system to:
identify, based on sensor data from the sensor, a first object at a first location in an environment associated with the vehicle, wherein the first location is at a first distance from the vehicle;
identify, based on the sensor data, a second object at a second location in the environment, wherein the second location is a second distance from the first location associated with the first object;
determine that the second object is generating a noise event at a first volume based at least in part on a third distance between the vehicle and the second object;
determine that second distance is equal to or less than a threshold distance;
determine, based at least in part on a determination that the second distance is equal to or less than the threshold distance, a noise level proximate to the first location associated with the first object, wherein the noise level is determined based at least in part on the first volume and the second distance;
determine, based at least in part on the noise level, at least one of a second volume or a frequency of a sound to emit; and
emit, via the speaker, the sound at the at least one of the second volume or the frequency.

2. The system of claim 1, wherein the instructions further cause the system to:
determine a first range of frequencies corresponding to noise events generated by other objects,
wherein the frequency is based at least in part on the first range of frequencies.

3. The system of claim 1, wherein the at least one of the second volume or the frequency are determined based on machine learned outputs of noises emitted by identified objects proximate to the first object.

4. The system of claim 1, wherein the sound is emitted in a beam formed audio signal directed toward the first object.

5. The system of claim 1, wherein the instructions further cause the system to:
determine, based on the sensor data, a first trajectory associated with the vehicle;
determine, based on the sensor data, a second trajectory associated with the object;
determine a potential conflict between the vehicle and the first object based on the first trajectory and the second trajectory;
determine an action to take to avoid the potential conflict; and
cause the vehicle to take the action.

6. A method comprising:
identifying, based on sensor data from a sensor coupled to a vehicle, an object at a first location in an environment associated with the vehicle, wherein the first location is a first distance from the vehicle;
identify, based on the sensor data, a noise generating object at a second location in the environment;
determine a volume of a noise emitted by the noise generating object based at least in part on a second distance between the second location and the vehicle;
determining a noise level proximate to the first location associated with the object based at least in part on a third distance between the first location and the second location and the volume of the noise emitted by the noise generating object;
determining, based at least in part on the noise level proximate to the location associated with the object, at least one of a second volume or a frequency of a sound to emit; and
causing the sound to be emitted via a speaker at the at least one of the second volume or the frequency.

7. The method of claim 6, wherein the noise level is based on noise events generated within a threshold distance of the object, the method further comprising:
determining a first range of frequencies corresponding to the noise level proximate to the object,
wherein the frequency is based at least in part on the first range of frequencies.

8. The method of claim 6, wherein the object is a first object, the method further comprising:
identifying a second object,
wherein determining the volume of the sound to emit is based at least in part on the second object.

9. The method of claim 6, further comprising:
determining a speed of the vehicle traveling through the environment, wherein determining the at least one of the second volume or the frequency is based at least in part on the speed of the vehicle.

10. The method of claim 6, further comprising:
determining a trajectory associated with the object; and
determining, based at least in part on the trajectory, a probability that the object will be within a threshold distance of the vehicle at a future time,
wherein determining the at least one of the second volume or the frequency of the sound to emit is based at least in part on the probability.

11. The method of claim 10, further comprising:
determining a change in the trajectory associated with the object; and
determining, based at least in part on the change in the trajectory, to stop emitting the sound via the speaker.

12. The method of claim 6, wherein determining the at least one of the second volume or the frequency is based in part on at least one of:
an occupancy of the vehicle;
a road condition;
a location of the vehicle in the environment;
a speed of the vehicle in the environment;
a time of day in which the vehicle is operating;
a day in a week in which the vehicle is operating; or
a weather condition in the environment.

13. The method of claim 6, further comprising:
determining a first trajectory associated with the object at a first time, wherein the first trajectory corresponds to a potential conflict between the vehicle and the object;
determining a second trajectory associated with the object at a second time;
determining that a difference between the first trajectory and the second trajectory is less than a threshold value;
determining at least one of a third volume or a second frequency of a second sound to emit based at least in part on the difference between the first trajectory and the second trajectory being less than the threshold value; and
causing the second sound to be emitted via the speaker at the at least one of the third volume or the second frequency.

14. The method of claim 6, further comprising:
identify a classification associated with the object,
wherein determining the at least one of the second volume or the frequency of the sound to emit is based at least in part on the classification associated with the object.

15. One or more non-transitory computer-readable media storing instructions that, when executed, cause a vehicle to perform operations comprising:
identifying, based on sensor data from a sensor coupled to the vehicle, an object at a first location in an environment associated with the vehicle, wherein the first location is a first distance from the vehicle;
identify, based on the sensor data, a noise generating object at a second location in the environment;
determine a volume of a noise emitted by the noise generating object based at least in part on a second distance between the second location and the vehicle;
determining a noise level proximate to the first location associated with the object based at least in part on a third distance between the first location and the second location and the volume of the noise emitted by the noise generating object;
determining, based at least in part on the noise level proximate to the first location associated with the object, at least one of a second volume or a frequency of a sound to emit; and
causing the sound to be emitted via a speaker coupled to the vehicle at the at least one of the volume or the frequency.

16. The one or more non-transitory computer-readable media of claim 15, wherein the noise level is determined based on:
accessing a database of noises to determine the volume of the noise associated with the first noise generating object; and
determining a perceived noise level of the noise by the object based at least in part on the second distance.

17. The one or more non-transitory computer-readable media of claim 16, wherein the noise generating object is a first noise generating object, the noise is a first noise, and the noise level is further determined based on:
determining a fourth distance between the object and a second noise generating object proximate to the object;
accessing the database of noises to determine a second noise associated with the second noise generating object;
determining a second perceived noise level of the second noise by the object based at least in part on the fourth distance; and
combining the first noise and the second noise to determine the noise level proximate to the object.

18. The one or more non-transitory computer-readable media of claim 15, the operations further comprising:
determining a speed of the vehicle traveling through the environment,
wherein determining the at least one of the second volume or the frequency is based at least in part on the speed of the vehicle.

19. The one or more non-transitory computer-readable media of claim 15, the operations further comprising:
determining a trajectory associated with the object; and
determining, based at least in part on the trajectory, a probability that the object will be within a threshold distance of the vehicle at a future time,
wherein determining the at least one of the second volume or the frequency of the sound to emit is based at least in part on the probability.

20. The one or more non-transitory computer-readable media of claim 19, wherein the sound is a first sound and the trajectory is a first trajectory associated with the object at a first time, the operations further comprising:
determining a second trajectory associated with the object at a second time;
determining, based at least in part on the second trajectory, a second probability that the object will be within a second threshold distance of the vehicle at a second future time;
determining at least one of a third volume or a second frequency of a second sound to emit based at least in part on the second probability; and
causing the second sound to be emitted via the speaker at the at least one of the second volume or the second frequency.

* * * * *